United States Patent [19]

Thackeray et al.

[11] Patent Number: 6,004,697

[45] Date of Patent: Dec. 21, 1999

[54] MODIFIED LITHIUM VANADIUM OXIDE ELECTRODE MATERIALS PRODUCTS AND METHODS

[75] Inventors: Michael M. Thackeray, Naperville; Arthur J. Kahaian, Chicago; Donald R. Visser, Naperville; Dennis W. Dees, Downers Grove; Roy Benedek, Western Springs, all of Ill.

[73] Assignees: Minnesota Mining & Manufacturing Co., St. Paul, Minn.; Hydro-Quebec Corporation, Montreal, Canada

[21] Appl. No.: 08/985,441

[22] Filed: Dec. 5, 1997

[51] Int. Cl.[6] .................................................. H01M 4/32
[52] U.S. Cl. ........................ 429/223; 429/224; 429/231.5; 429/231.9; 429/231.95; 423/464; 423/465; 423/593; 423/594; 423/595; 423/596; 423/599; 423/600; 204/291; 204/292
[58] Field of Search .................................... 429/224, 223, 429/218, 231.5, 231.9, 231.95; 423/464, 465, 593, 594, 595, 596, 599, 600; 204/291, 292

[56] References Cited

U.S. PATENT DOCUMENTS

| | | | |
|---|---|---|---|
| 4,803,137 | 2/1989 | Miyazaki et al. | 429/194 |
| 5,221,453 | 6/1993 | Crespi | 204/291 |
| 5,326,545 | 7/1994 | Koksbang et al. | 423/62 |
| 5,334,334 | 8/1994 | Koksbang | 264/28 |
| 5,336,572 | 8/1994 | Koksbang | 429/218 |
| 5,389,472 | 2/1995 | Takeuchi et al. | 429/219 |
| 5,425,932 | 6/1995 | Tarascon | 423/599 |
| 5,618,640 | 4/1997 | Idota et al. | 429/194 |
| 5,759,720 | 6/1998 | Amahicci et al. | 429/224 |

FOREIGN PATENT DOCUMENTS 7-33443  2/1995  Japan.

OTHER PUBLICATIONS

Author Unknown, "Lithium/Manganese Dioxide (Li/MnO$_2$) Cells", *Primary Batteries*, 1 page (Date Unknown).

Dahn, J.R. et al., "Rechargeable LiNiO$_2$/Carbon Cells", *J. Electrochemical Society*, 138(8): 2207–2211 (Aug. 1991).

de Kock, A. et al., "Defect Spinels in the System Li$_2$O.yMnO$_2$(y>2.5): A Neutron–Diffraction Study and Electrochemical Characterization of Li$_2$Mn$_4$O$_9$", *Mat. Res. Bull.*, 25: 657–664 (1990) No month available.

de Picciotto L.A. et al., "Structural characterization of Li$_{1+x}$V$_3$O$_8$ insertion electrodes by single–crystal X–ray diffraction", *Solid State Ionics*, 62: 297–307 (1993) No month available.

Gummow, R.J., et al., "Improved capacity retention in rechargeable 4 V lithium/lithium–manganese oxide (spinel) cells", *Solid State Ionics*, 69: 59–67 (1994) No month available.

Guyomard, D. et al., "High voltage stable liquid electrolytes for Li$_{1+x}$Mn$_2$O$_4$/carbon rocking–chair lithium batteries", *Journal of Power Sources*, 54: 92–98 (1995) No month available.

Mizushima, K. et al., "Li$_x$CoO$_2$ (0<x≦1): A New Cathode Material For Batteries of High Energy Density", *Solid State Ionics*, 3/4: 171–174 (1981) No month available.

Ozawa, K., "Lithium–ion rechargeable batteries with LiCoO$_2$ and carbon electrodes: the LiCoO$_2$/C system", *Solid State Ionics*, 69: 212–221 (1994) No month available.

Panero, S. et al., "Rechargeable Li/Li$_{1+x}$V$_3$O$_8$ Cells", *J. Electrochemical Society*, 130(5): 1225–1227 (May 1983).

Pasquali, M. et al., "Li/Li$_{1+x}$V$_3$O$_8$ Batteries V. Comparison with Other Secondary Cells and Influence of Micro– and Macro–Structural Alterations on the Cathode Performance", *J. Electrochemical Society*, 133(12): 2454–2458 (Dec. 1986).

Pistoia, G. et al., "Li/Li$_{1+x}$ V$_3$O$_8$ Secondary Batteries III. Further Characterization of the Mechanism of Li$^+$ Insertion and of the Cycling Behavior", *J. Electrochemical Society*, 132(2): 281–284 (Feb. 1985).

Pistoia, G. et al., "Li/Li$_{1+x}$ V$_3$O$_8$ Secondary Batteries Synthesis and Characterization of an Amorphous Form of the Cathode", *J. Electrochemical Society*, 137(8): 2365–2370 (Aug. 1990).

Pistoia, G. et al., "Solid Solutions Li$_{1+x}$V$_3$O$_8$ As Cathodes For High Rate Secondary Li Batteries", *Solid State Ionics*, 13: 311–318 (1984) No month available.

Pistoia, G. et al., "Thermodynamic Study of Lithium Insertion in V$_6$O$_{13}$ and Li$_{1+x}$V$_3$O$_8$", *Solid State Ionics*, 20: 25–30 (1986) No month available.

Spahr, M.E. et al., "Electrochemistry of Chemically Lithiated NaV$_3$O$_8$: A Positive Electrode Material for Use in Rechargeable Lithium–Ion Batteries", *J. Electrochemical Society*, 145(2): 421–427 (Feb. 1998).

Tarascon, J.M. et al., "An update of the Li metal–free rechargeable battery based on Li$_{1+x}$Mn$_2$O$_4$ cathodes and carbon anodes", *Journal of Power Sources*, 43–44: 689–700 (1993) No month available.

Tarascon, J.M. et al., "Li Metal–Free Rechargeable Batteries Based on Li$_{1+x}$Mn$_2$O$_4$ Cathodes (0≦x≦1) and Carbon Anodes", *J. Electrochemical Society*, 138(10): 2864–2868 (Oct. 1991).

Tarascon, J.M. et al., "Synthesis Conditions and Oxygen Stoichiometry Effects on Li Insertion into the Spinel LiMn$_2$O$_4$", *J. Electrochemical Society*, 141(6): 1421–1431 (Jun. 1994).

(List continued on next page.)

*Primary Examiner*—Bruce F. Bell
*Attorney, Agent, or Firm*—Mueting, Raasch & Gebhardt, P.A.

[57] ABSTRACT

A method of improving certain vanadium oxide formulations is presented. The method concerns fluorine doping formulations having a nominal formula of LiV$_3$O$_8$. Preferred average formulations are provided wherein the average oxidation state of the vanadium is at least 4.6. Herein preferred fluorine doped vanadium oxide materials, electrodes using such materials, and batteries including at least one electrode therein comprising such materials are provided.

18 Claims, 18 Drawing Sheets

OTHER PUBLICATIONS

Tarascon, J.M. et al., "The $Li_{1+x}Mn_2O_4$/C Rocking–Chair System: A Review", *Electrochemica Acta*, 38(9): 1221–1231 (1993) No month available.

Tarascon, J.M. et al., "The $Li_{1+x}Mn_2O_4$/C system Materials and electrochemical aspects", *Journal of Power Sources*, 54: 103–108 (1995) No month available.

Tarascon, J.M. et al., "The Spinel Phase of $LiMn_2O_4$ as a Cathode in Secondary Lithium Cells", *J. Electrochemical Society*, 138(10): 2859–2864 (Oct. 1991).

Thackeray, M.M. et al., "Electrochemical Extraction of Lithium from $LiMn_2O_4$", *Mat. Res. Bull.*, 19: 179–187 (1984) No month available.

Thackeray, M.M. et al., "Spinel Electrodes from the Li–Mn–O System for Rechargeable Lithium Battery Applications", *J. Electrochemical Society*, 139(2): 363–366 (Feb. 1992).

Wadsley, A.D., "Crystal Chemistry of Non–stoichiometric Pentavalent Vanadium Oxides: Crystal Structure of $Li_{1+x}V_3O_8$", *Acta Crystallographica*, 10: 261–267 (1957) No month available.

West, K. et al., "Comparison of $LiV_3O_8$ Cathode Materials Prepared by Different Methods", *J. Electrochemical Society*, 143(3): 820–825 (Mar. 1996).

1

MODIFIED LITHIUM VANADIUM OXIDE ELECTRODE MATERIALS PRODUCTS AND METHODS

STATEMENT OF GOVERNMENT RIGHTS

The Government of the United States of America has rights to this invention pursuant to Cooperative Agreement No. DE-FC02-91CE50336 awarded by the U.S. Department of Energy.

FIELD OF THE INVENTION

The present invention relates to certain modified lithium vanadium oxides. Included are preferred oxides according to the general formula $Li_{1.2}V_3O_{8-\delta}F_\delta$ and certain related oxides such as $Li_{1.2}V_{3-\delta}M_\delta O_{8-\delta}F_\delta$, wherein M can be a variety of cations (or a mixture of cations). The invention concerns the utilization of such oxide materials as electrode materials, for example, as cathode materials in lithium batteries. The disclosure concerns preferred formulations of such materials, preferred methods for preparation of them, products including such materials and methods of use.

BACKGROUND OF THE INVENTION

The negative electrode (anode) of a high density lithium battery typically comprises one or more of a variety of any suitable lithium-containing substances such as: metallic lithium; lithium-metal alloys; lithium metal oxides; or, lithium carbon composites. The positive electrode (cathode) is typically a lithium vanadium oxide, of the nominal or base formula $LiV_3O_8$. The electrodes may be coupled using a liquid electrolyte or a solid electrolyte such as a solid polymer electrolyte, or a combination of liquid and solid electrolytes. The electrolyte may specifically be a "plasticized" electrolyte in which a liquid electrolyte component is contained within a polymer electrolyte.

During discharge, lithium ions are electrochemically inserted into the lithium vanadium oxide structure by a process that is commonly referred to as intercalation. A reverse process occurs during charge. The vanadium ions of the host electrode structure are reduced and oxidized during discharge and charge, respectively. Conversely, the negative electrode is oxidized during discharge when lithium ions are released from the electrode into the electrolyte, and it is reduced during the reverse process on charge. Lithium ions, therefore, shuttle between the two electrodes during the electrochemical discharge and charge processes.

It is advantageous for batteries, such as lithium batteries, to have a high electrochemical "capacity" or energy storage capability. In lithium batteries, this can be achieved if the positive and negative electrodes can accommodate a significant amount of lithium. Furthermore, in order to have a good cycle life, the positive and negative electrodes should have the ability to accommodate and release lithium in a reversible manner, i.e., without significant "capacity fade". Thus, the structural integrity of the electrodes should be maintained during lithium insertion/extraction for numerous cycles.

SUMMARY OF THE INVENTION

According to the present invention, a vanadium oxide material doped with fluorine is provided. Preferred formulations, providing for an overall charge balance in which the average, calculated, oxidation state of vanadium is at least 4.6, usually at least 4.8 and preferably at least 4.9, are provided.

The invention also concerns the provision of electrodes including lithium vanadium oxide according to the preferred general formula; and, batteries including an electrode as characterized. The invention further concerns a method of modifying a nominal vanadium oxide formula through fluorine doping.

DETAILED DESCRIPTION

Figure 1:
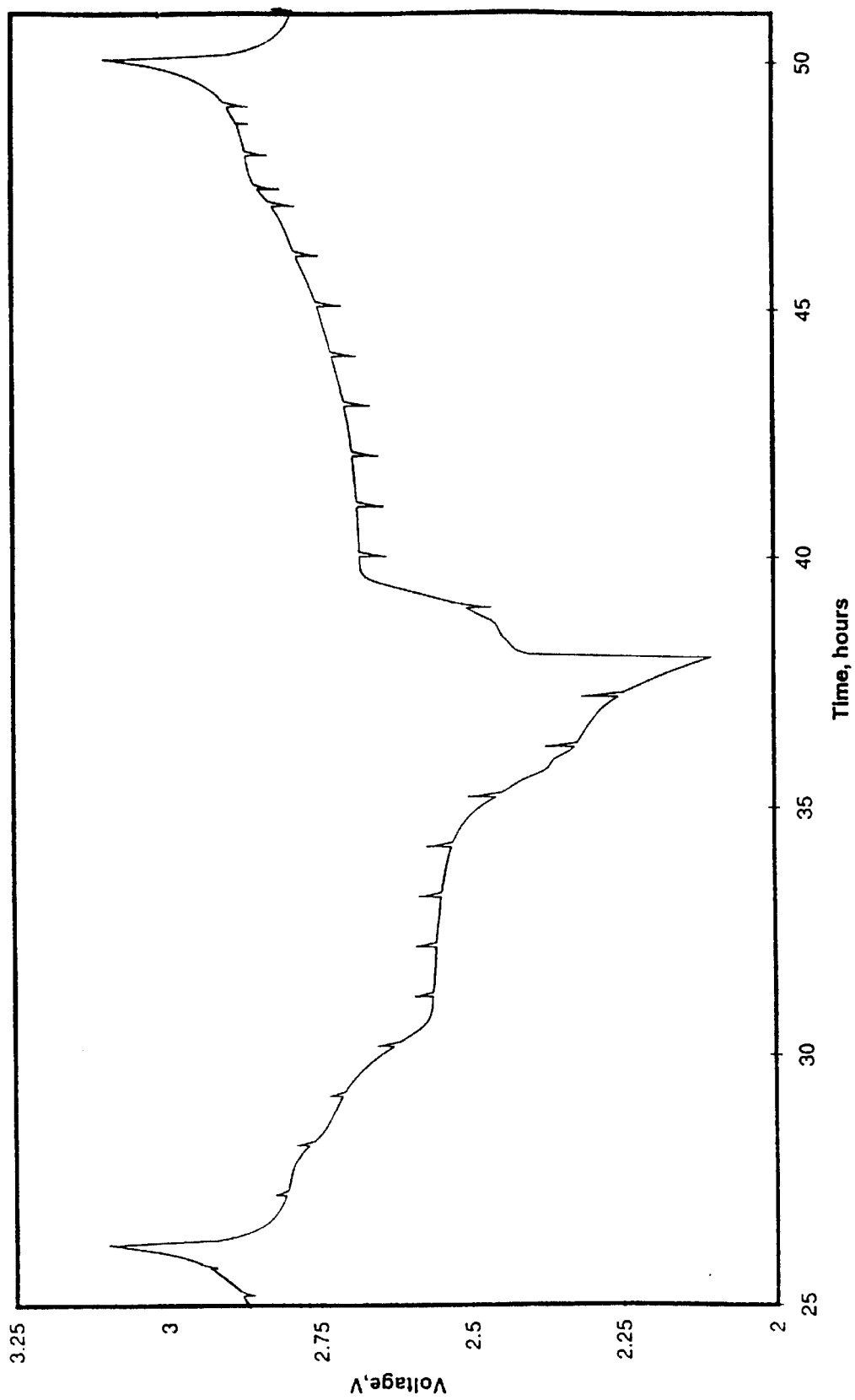
FIG. 1 is a discharge/charge profile of an electrochemical cell having, as an electrode, $Li_{1.2}V_3O_8$.

I. A General Description of $LiV_3O_8$ Electrode Materials

A preferred vanadium oxide electrode material, for use with respect to lithium batteries of concern to the present invention will be referenced generally as having a "nominal" formula of $Li_xV_3O_8$, wherein x is typically at least 1.0, usually about 1.0 to 1.5 and often about 1.2. The crystalline structure of this material is relatively stable, and is preferential with respect to intercalation. This nominal or base formula is the approximate formula at complete charge.

Oxides of nominal formula $Li_xV_3O_8$ exhibit a distinctive X-ray diffraction pattern (XRD) and crystalline structure, as discussed below.

The specific preferred stoichiometry for the most stable electrode in the charged state is $Li_{1.2}V_3O_8$. By this it is meant that the preferred material is formulated from precursor materials such that in a fully charged cell the average formulation of the cathode, with respect to the vanadium oxide component, is $Li_{1.2}V_3O_8$. The average (calculated) vanadium valence in $Li_{1.2}V_3O_8$ is 4.933 or "nominally" 5.

As the battery is discharged, lithium cations are inserted into the crystalline $Li_{1.2}V_3O_8$ electrode structure. This reduces the average oxidation state of the vanadium ions from 4.933 in $Li_{1.2}V_3O_8$ to 4.0 in $Li_4V_3O_8$, which represents the approximate composition of the positive electrode in a discharged cell.

According to the present invention, the nominal $LiV_3O_8$ structure, typically and preferably $Li_{1.2}V_3O_8$, is modified to advantage. The modification, in part, concerns "doping" with fluorine. The substitution of fluorine ions for some oxygen ions can lead to stabilization, as discussed below. In some instances, the "fluorine doping" is accompanied by a preferred introduction of further cations, for example, additional lithium cations or other cations, into the crystalline structure.

II. Preferred Modified Electrode Materials

A. Electrode Materials in Which the Only Cations (other than impurities) Are Lithium and Vanadium According to this aspect of the present invention, preparation of a lithium vanadium oxide of the general (base or nominal) formula $Li_xV_3O_8$ preferably wherein $x \geq 1$ (typically 1.0 to 1.5 and more preferably is about 1.2) is modified by fluorine substitution (doping) to lead to a preferred fluorine-doped material. For example, in a particular embodiment, the oxygen ions may be partially substituted by fluorine, preferably to a material having the general formula $Li_{1.2}V_3O_{8-\delta}F_\delta$ wherein $0 < \delta \leq 1.0$.

Typically and preferably, $\delta$ is within the range of 0.05 to 0.3.

In $Li_{1.2}V_3O_8$ the mean oxidation state of vanadium is 4.933. Substitution of fluorine for oxygen as characterized in the previous paragraph, but in such a manner that the vanadium oxide state is kept equal to or close to its relatively high original value of 4.933, more generally at least 4.6 (usually at least 4.8, typically and preferably at least 4.9), can be achieved by substituting some lithium ions for some of the vanadium ions. A class of stabilized lithium vanadium oxides (base formulation) according to this aspect of the invention would preferably be characterized by the following general formula: $Li_{1.2+\delta'}V_{3-\delta}O_{8-\delta}F_\delta$ wherein $\delta'$ is equal to $0.254\delta$. The value for $\delta'$ results from a calculation as follows:

The charge balance must be zero, so:

Assuming a "preferred" average oxidation state for V ions of 4.933 in a fully-charged electrode, then:

$$(1.2+\delta')+(4.933)(3-\delta')+(-2)(8-\delta)+(-1)(\delta)=0 \quad (1)$$

or $$1.2+\delta'+14.799 \text{ (or about 14.8)} -4.933\delta'-16+2\delta-\delta=0$$

or $$-3.933\delta'+\delta=0$$

so $$\delta=+3.933\delta'$$

or $$\delta'=0.254\delta$$

Thus, for example, for $\delta=0.2$, the formula would be: $Li_{1.25}V_{2.95}O_{7.8}F_{0.2}$.

The type of calculation discussed above is sometimes referred to herein as a "valence type" calculation and can be applied to determine a variety of unknowns.

B. Electrode Materials In Which Cations Other Than Lithium And Vanadium Are Also Provided In further embodiments of the present invention, in addition to substitution of fluorine for some oxygen compounds, substitution of vanadium by another element, preferably a cation in addition to lithium, is used. This can also be a method of maintaining the average, calculated, oxidation state of vanadium at or near 4.933, or more generally at a value of at least 4.6 (usually at least 4.8, typically and preferably at least 4.9) in the fully charged state.

Substitution of a metal cation for some of the vanadium in the material results in a general formula as follows: $Li_{1.2}V_{3-\delta}M_\delta O_{8-\delta}F_\delta$ wherein the relationship between $\delta$ and $\delta'$ can be calculated in a like manner as given above, with an additional term corresponding to the valency of the cation M. For example, if the cation M is chosen to be a tetravalent cation such as titanium ($Ti^{+4}$) or zirconium ($Zr^{+4}$), the relationship between $\delta$ and $\delta'$ (calculated analogously to the calculation given above) is: $\delta'=1.075\delta$ A base formula for a preferred group of such stabilized compounds would be as follows: $Li_{1.2}V_{3-\delta'}M_{\delta'}O_{8-\delta}F_\delta$ wherein M is a cation selected from Al, Si, P, Sc, Ti, Cr, Mn, Fe, Co, Ni, Cu, Zn, Ge, Y, Zr, Nb, Mo, La and mixtures thereof. Preferred cations, M, are those that form strong M—O bonds, such as Al, Si, P, Sc, Ti, Ge, Y, Zr, Nb, Mo and La. As an example, and using the valence calculation discussed above; for $\delta=0.1$ and M=Ti, a preferred formula would be $Li_{1.2}V_{2.8925}Ti_{0.1075}O_{7.9}F_{0.1}$.

In general, it is preferred to use a transition element "M" (or mixture of elements of "M") which does not, in the amounts used, generate a significant amount of a second impurity phase along with $Li_{1.2}V_3O_8$.

In various embodiments of the present invention, it is possible to use two or more different cations as substituents for some of the vanadium ions. For example, it is possible to replace two pentavalent vanadium ions ($V^{+5}$) in the lithium-vanadium-oxide crystal lattice by one hexavalent molybdenum ($Mo^{+6}$) ion and one tetravalent zirconium ($Zr^{+4}$) or titanium ($Ti^{+4}$) ion. In this instance, substitution of two metal cations for some of the vanadium in the material results in the general formula: $Li_{1.2}V_{3-2\delta'}M'_{\delta'}M''_{\delta'}O_{8-\delta}F_\delta$ wherein the relationship between $\delta$ and $\delta'$ can be calculated in a like manner as given above.

Thus, as an example, for $M'=Mo^{+6}$, $M''=Ti^{+4}$, $\delta=0.1$ and $\delta'=0.1$, a preferred formula would be: $Li_{1.2}V_{2.8}Mo_{0.1}Ti_{0.1}O_{7.9}F_{0.1}$.

III. Methods of Preparation

Materials according to the present invention can be readily prepared by modifications to known techniques for manufacture of $Li_xV_3O_8$.

For example, $Li_{1.2}V_3O_8$ electrode materials can be manufactured by reaction of LiOH with $NH_4VO_3$ in methanol, with follow up firing to 400° C.; as described further in the experimental section.

Fluorine introduction can be readily achieved by introducing LiF in place of some of the lithium hydroxide, in an appropriate amount to achieve the desired stoichiometry. Additional modifications in lithium can be introduced by adding further LiOH.

Similarly, other metal cations can be introduced into the crystal structure of the electrode. For example, titanium can be introduced by the addition of $Ti[OCH(CH_3)_2]_4$ to the reaction mixture, zirconium by $Zr[OCH(CH_3)_2]_4$ $(CH_3)_2CH_2OH$ and molybdenum by $MoO_3$. For other cations, the compounds can be selected from oxides, hydroxides or salts such as alkoxides, oxalates, acetates and nitrates.

Electrodes can be prepared from the oxide base by coating onto a metallic current collector a slurry containing the oxide base, a polymeric binder such as polyvinylidinefluoride (PVDF), an electrically conductive particle such as conductive carbon particles, and a solvent such as toluene, and drying the coating, to form the electrode.

IV. Some Theories For Certain Observed Stabilization Effects

Electrode materials of the type described herein would typically be used in high energy density lithium storage batteries. The capacity fade that occurs with time for certain types of such batteries during repeated discharge and charge can be attributed to a number of possible factors. $Li_{1.2}V_3O_8$ has a layered-type crystal structure. During discharge, lithium ions are inserted into a $Li_{1.2+x'}V_3O_8$ structure (typically $0 \leq x' \leq 2.8$). Capacity fade phenomena could result for example, either from (1) structural fatigue due to anisotropic variations in the lattice parameters during charge and discharge, or (2) migration of vanadium ions from their original positions into the layers occupied by lithium, thereby, restricting lithium mobility, or (3) the dissolution of some vanadium from the crystal lattice into the electrolyte, or a combination of (1), (2) and (3).

In preferred lithium vanadium oxide cathode arrangements according to the present invention, at the "top of the charge", the vanadium is in an average oxidation state approaching $V^{+5}$ (typically and preferably about 4.933, more generally at least 4.6) and at the end of discharge it is closer to $V^{+4}$. Vanadium in lower oxidation states is believed to be somewhat more soluble in certain electrolytes than at higher oxidation states. This could be partly responsible for some of the observed deterioration of the cathode operation, with cycling for certain types of batteries.

Without being bound to any particular theory, it is presently believed that the fluorine-doped systems (in particular the fluorine-doped and M-cation doped systems) are stabilized by introduction of the fluorine ions and M cations into the crystal structure. A possible reason for this could be differences in strength between vanadium-fluorine, vanadium-oxygen, and M-oxygen bonds. It can be reasoned that the minor introduction of fluorine ions and, if desired M cations, may add integrity to the vanadium oxide crystalline structure, as a result of the introduction of strong vanadium-fluorine and M-oxygen bonds. The net result of this could be either or both of inhibiting vanadium migration and/or inhibiting solubility. In some instances this may manifest itself by a lessening of capacity fade.

In general, the preferred formulations provided are arrived at by focusing on two principal factors:

1. A desire to maintain the vanadium valence state, at the top of charge, as close to 4.933 as reasonably possible, and more generally at least 4.6 (usually at least 4.8 and preferably at least 4.9) in the stabilized $Li_{1.2}V_3O_8$ (base) crystal structure.

2. Introduction of no more fluorine ions into the crystalline structure than is useful to achieve the desired level of stabilization, because of a desire not to greatly depart from the stoichiometry of the $Li_{1.2}V_3O_8$ base, and to keep the level of fluorine (a chemically aggressive reagent) in the oxide as low as reasonably possible.

In general, the crystalline structure of $Li_{1.2}V_3O_8$ is layered. Three vanadium ions and one lithium ion typically occupy octahedral sites in the $Li_{1.2}V_3O_8$ structure; the remaining (for example 0.2) lithium ions occupy tetrahedral sites. During discharge, the lithium ions migrate into neighboring octahedral sites to generate a stable defect rocksalt structure. The approximate composition at the end of discharge is $Li_4V_3O_8$.

Substitution of oxygen with fluorine in $Li_{1.2}V_3O_{8-67}F_\delta$ results in a lowering of the average oxidation state of the vanadium ions in the structure. Compensation for this can be accomplished by increasing the presence of other cations, for example, by introduction of more lithium or by introduction of other cations. As a result, a charge balance, with the average vanadium charge of about 4.933 (generally at least 4.6, usually at least 4.8 and preferably at least 4.9), calculated as discussed above, can be maintained.

Preferred cations to introduce for this purpose are titanium and/or zirconium, although other cations and even mixtures, can be used. The titanium or zirconium doped systems are advantageous because of the relatively strong titanium-oxygen or zirconium-oxygen bonds in the crystal structure. It can be reasoned that such bonds will serve to strengthen and maintain the integrity of the overall crystal structure, particularly during cell operation when lithium is being repeatedly inserted into and extracted from the structure.

V. General Formulae of Preferred Materials Based on the Above-Recited Principles and Descriptions A general formula of a preferred vanadium oxide material, useable as a cathode material as described above at least when defined in the charged state, would be as follows:

$$Li_xM_yV_zO_{8-\delta}F_\delta$$

wherein preferably:

(a) $0 < \delta \leq 1$ (preferably $0.05 \leq \delta \leq 0.3$)

(b) $0 \leq y \leq 0.5$ (c) x is non-zero (typically and preferably $1 \leq x \leq 1.5$ usually x is about 1.2;

(d) x, y and z are selected such that the average, calculated, oxidation state of V is at least 4.6, more preferably at least 4.8 and most preferably at least 4.9; and, (e) M is selected from ions of Al, Si, P, Sc, Ti, Cr, Mn, Fe, Co, Ni, Cu, Zn, Ge, Y, Zr, Nb, Mo, La and mixtures thereof (preferably Ti, Y, Zr, Mo and mixtures thereof).

In one preferred embodiment: y=0; z=3; and, x=1.2. If lithium presence is increased to maintain a preferred calculated valance for the vanadium, in one preferred embodiment: y=0; z=3−δ'; and x=1.2+δ', wherein δ'=0.254δ. In those formulations in which y>0, preferably: M is Ti or Zr; x=1.2; z=3−δ'; and y=δ'; wherein δ'=1.075δ.

Preferred electrodes comprise a vanadium oxide base according at least one of the preferred formulae recited above; and, preferred battery constructions include at least one preferred electrode as characterized.

It should be appreciated that in some instances M may be a mixture of cations and thus $M_y$ would comprise such formulae as: $M'_{y'} M''_{y''}$; $M'_{y'} M''_{y''} M'''_{y'''}$; ... etc. The term "$M_y$" is intended to include mixtures of this type. In such instances the limitation on "y" is intended to be on the averaged cation "M" resulting from averaging the valence of the various M', M", etc., using a mole-weighted, valence charge balance calculation analogous to the ones discussed above. Preferred electrodes which contain a mixture of cations are those in which M is derived from Ti, Y, Zr and Mo.

As indicated above, the formulae given herein for the preferred vanadium oxide materials are generally in reference to the material as it would be found in an electrode in the fully charged state. During discharge, and intercalation, lithium ion introduction will modify the formulae.

VI. An Example Battery Construction

Typically battery constructions that can use the preferred cathode materials according to the present invention include otherwise conventional coin cells, wound cells and stacked cells in which the cathode oxide is replaced with the preferred oxide(s) described herein. Various useable conventional constructions are described in *Handbook of Batteries*, 2d Ed., edited by D. Linden et al., McGraw-Hill, 1995, the disclosure of which is incorporated herein by reference.

Figure 18:
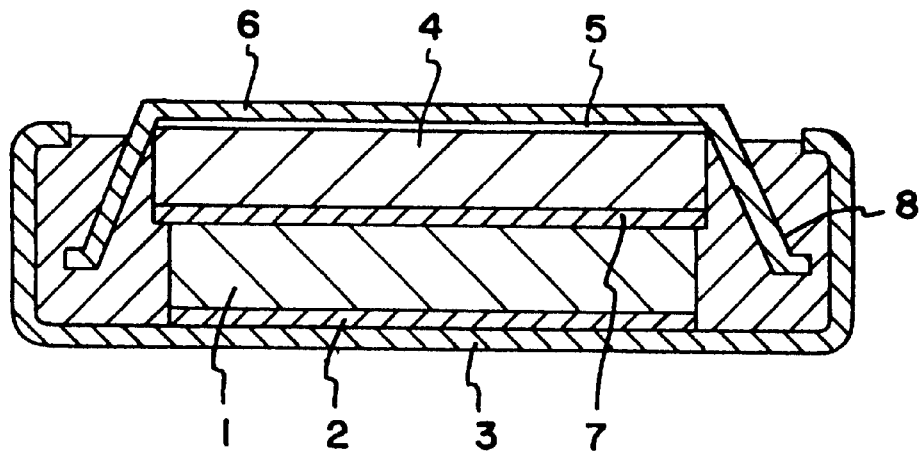
FIG. 18 is a schematic cross-sectional representation of a cell incorporating an electrode according to the present invention.

An example cell is shown in FIG. 18. The cell may generally be according to the description of U.S. Pat. No. 4,803,137, incorporated herein by reference, except in that the cathode includes a vanadium oxide material as described herein. Referring to FIG. 18, the cell depicted includes: a cathode 1; a positive electrode current collector 2; a positive electrode casing 3; an anode 4; a negative electrode current collector 5; a negative electrode casing 6; separator/electrolyte 7; and, insulating polypropylene gasket 8. Except for advantages from use of a vanadium oxide material as described herein, the cell would operate in an otherwise typical fashion.

Figure 19:
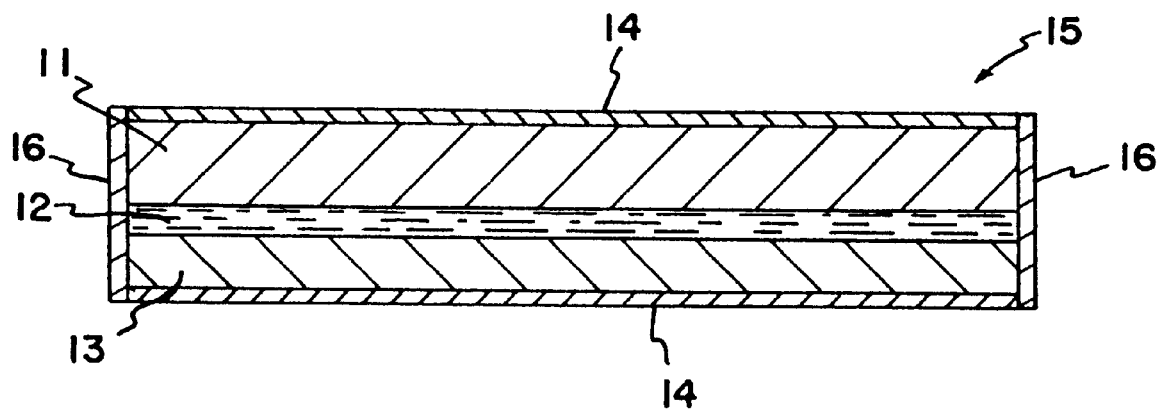
FIG. 19 is a second schematic illustration of a cell.

Another schematic illustration of the electrochemical cell is shown in FIG. 19. The cell is designated 15, and the anode (negative electrode), electrolyte and cathode (positive electrode) are designated 11, 12, and 13, respectively, with the anode 11 separated from the cathode 13 by the electrolyte 12. Suitable terminals designated 14 are provided in electronic contact with the 11 anode and the 13 cathode. The cell 15 is contained in a housing, designated 16, which insulates the anode from the cathode. The cell 15 may include, at the cathode 13, vanadium oxide material according to the present invention.

VII. Experimental
A. Preparation of Various Oxide Materials for Testing

Example 1
$Li_{1.2}V_3O_8$ (A comparative example)

For this preparation, 1.2 moles of $LiOH.H_2O$ and 3 moles of $NH_4VO_3$ were suspended in methanol and milled for 48 hours. The methanol was evaporated and the dry solid precursor heated in air. The sample was heated to 400° C. at a rate of 1° C./min. and held at 400° C. for 24 hours. It was then allowed to cool to room temperature (at about a 1° C./min. cooling rate). The product was ground to a fine powder by mortar and pestle and submitted for phase identification by X-ray powder diffraction.

Example 2
$Li_{1.2}V_3O_{8-\delta}F_\delta$

For these preparations, 1.2–δ moles of $LiOH.H_2O$, δ moles of LiF and 3 moles of $NH_4VO_3$ were suspended in methanol and milled for 48 hours. The methanol was evaporated and the dry solid precursor, slightly yellow in color when compared to $Li_{1.2}V_3O_8$, was heated in air. The sample was heated to 400° C. at a rate of 1° C./min. and held at 400° C. for 24 hours, then allowed to cool to room temperature (at about a 1° C./min. cooling rate). The product was ground to a fine powder and submitted for phase identification by X-ray powder diffraction.

Example 3
$Li_{1.25}V_{2.95}O_{7.8}F_{0.2}$ [i.e., $Li_{1.2+\delta'}V_{3-\delta'}O_{8-\delta'}F_{\delta'}$, wherein δ'=0.2545δ for δ=0.2].

For this preparation, 1.05 moles of $LiOH.H_2O$, 0.2 moles of LiF and 2.95 moles $NH_4VO_3$ were suspended in methanol and milled for 48 hours. The methanol was evaporated and the dry solid precursor heat treated in air. The sample was heated to 400° C. at a rate of 1° C./min. and held at 400° C. for 24 hours, then allowed to cool to room temperature (at about a 1° C./min. cooling rate). The product was ground to a fine powder and submitted for phase identification by X-ray powder diffraction.

Example 4
$Li_{1.2}V_{2.8925}Ti_{0.1075}O_{7.9}F_{0.1}$

For this preparation, 1.1 moles of $LiOH.H_2O$, 0.1 moles of LiF, 0.1075 moles of $Ti[OCH(CH_3)_2]_4$, and 2.8925 moles of $NH_4VO_3$ were suspended in methanol and milled for 48 hours. The methanol was evaporated and the dry solid precursor heat treated in air. The sample was heated to 400° C. at a rate of 1° C./min. and held at 400° C. for 24 hours, then allowed to cool to room temperature (at about a 1° C./min. cooling rate). The product was ground to a fine powder and submitted for phase identification by X-ray powder diffraction.

Example 5
$Li_{1.2}V_{2.8925}Zr_{0.1075}O_{7.9}F_{0.1}$

For this preparation, 1.1 moles of $LiOH.H_2O$, 0.1 moles of LiF, 0.1075 moles of $Zr[OCH(CH_3)_2]_4(CH_3)_2CH_2OH$ and 2.8925 moles of $NH_4VO_3$ were suspended in methanol and milled for 48 hours. The methanol was evaporated and the dry solid precursor was heat treated in air. The sample was heated to 400° C. at a rate of 1° C./min. and held at 400° C. for 24 hours, then allowed to cool to room temperature (at about a 1° C./min. cooling rate). The product was ground to a fine powder and submitted for phase identification by X-ray powder diffraction.

Example 6
$Li_{1.2}V_{2.8}Ti_{0.1}Mo_{0.1}O_{7.9}F_{0.1}$ 1.1 moles of $LiOH.H_2O$, 0.1 moles of LiF, 0.1 moles of $Ti[OCH(CH_3)_2]_4$, 0.1 moles of $MoO_3$ and 2.8 moles of $NH_4VO_3$ were suspended in methanol and milled for 48 hours. The methanol was evaporated and the dry solid precursor was heat treated in air. The sample was heated to 400° C. at a rate of 1° C./min. and held at 400° C. for 24 hours, then allowed to cool to room temperature (at about a 1° C./min. cooling rate). The product was ground to a fine powder and submitted for phase identification by X-ray powder diffraction.

B. Electrochemical Testing

Example 7

The materials of Examples 1–6 were screened for electrochemical performance in standard 1225 coin cells. A cathode laminate of each material was prepared by mixing, by weight: 81% active (test) material; 10% Kynar (binder available from ELF Autochem North America, Inc. of Philadelphia, Pa.); and, 9% carbon (VX C72 available from CABOT Corp. of Boston, Mass.), with milling in tetrahydrofuran. For $Li_{1.2}V_3O_8$, two separate cathode laminates were made and evaluated, to examine possible variance based on production variables.

To prepare the cathode, the laminate mixture was poured onto a smooth surface and applied with a doctor-blade to uniform thickness. When the mixture was sufficiently dry, a laminate disk approximately ¼ inch (6.35 mm) in diameter was punched out. The disks were dried in a vacuum overnight at about 80° C. The coin cells were then prepared by stacking, in order: can (hardware); copper spacer; lithium disk; separator; a few drops of dimethoxyethane (to help wet the separator); 1.0 M $LiPF_6$ in ethylene carbonate/dimethylcarbonate, 50%/50% by weight (electrolyte); cathode laminate; insulating spacer, to assure stack height of 75/80 mil.; and cap (hardware). The coin cells were crimped in a hydraulic press.

Coin cells of general notation, Li/1.0M $LiPF_6$, DMC, EC/$Li_{1.2}V_3O_8$ (or doped) material were cycled at constant current (typically 0.1 mA) between 3.1–2.1 V for at least 20 cycles. The test equipment was a Series 2000 Maccor Cycler.

C. Evaluation of Data

Figure 2:
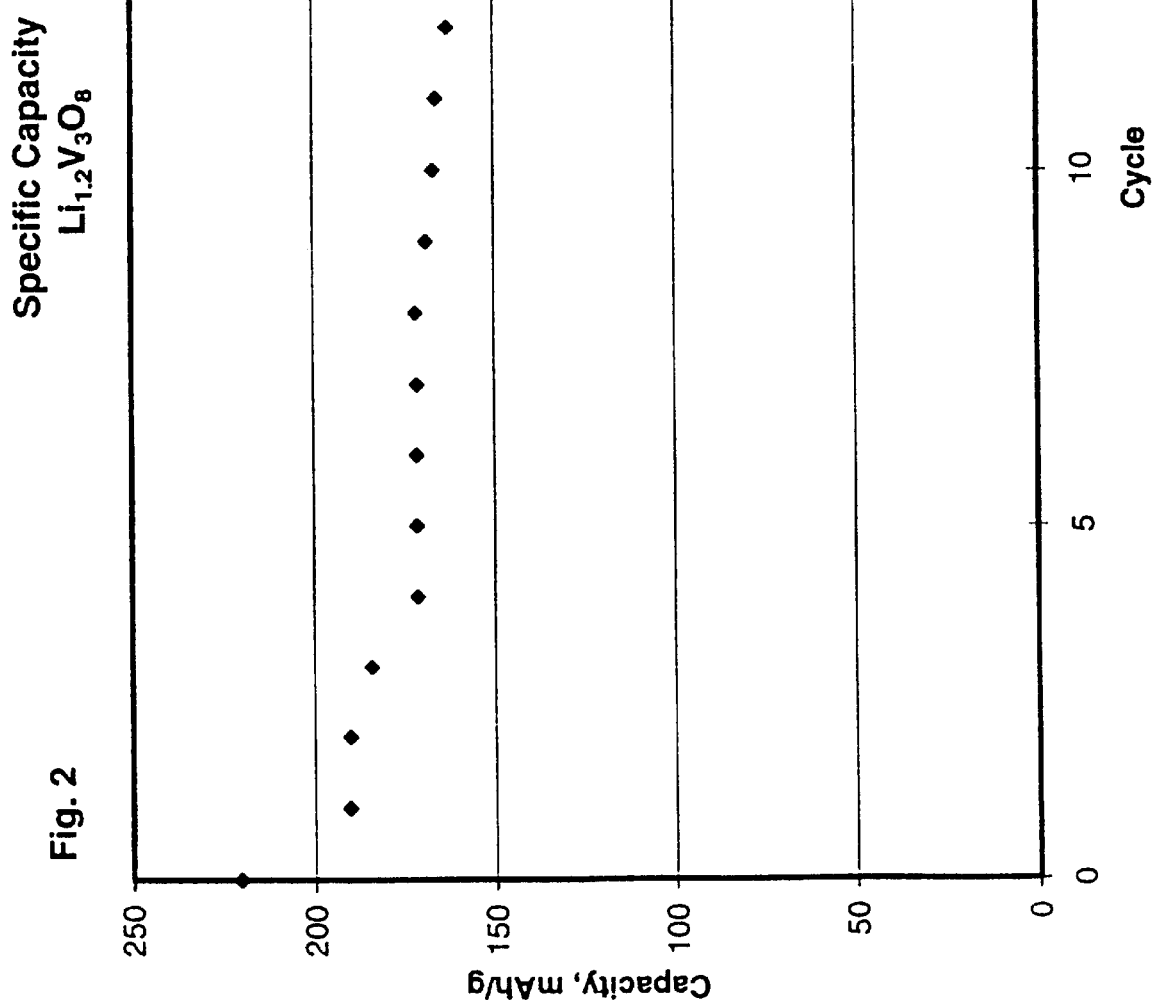
FIG. 2 is an individual plot of discharge capacity versus the cycle number for a battery having as an electrode, $Li_{1.2}V_3O_8$.
Figure 3:
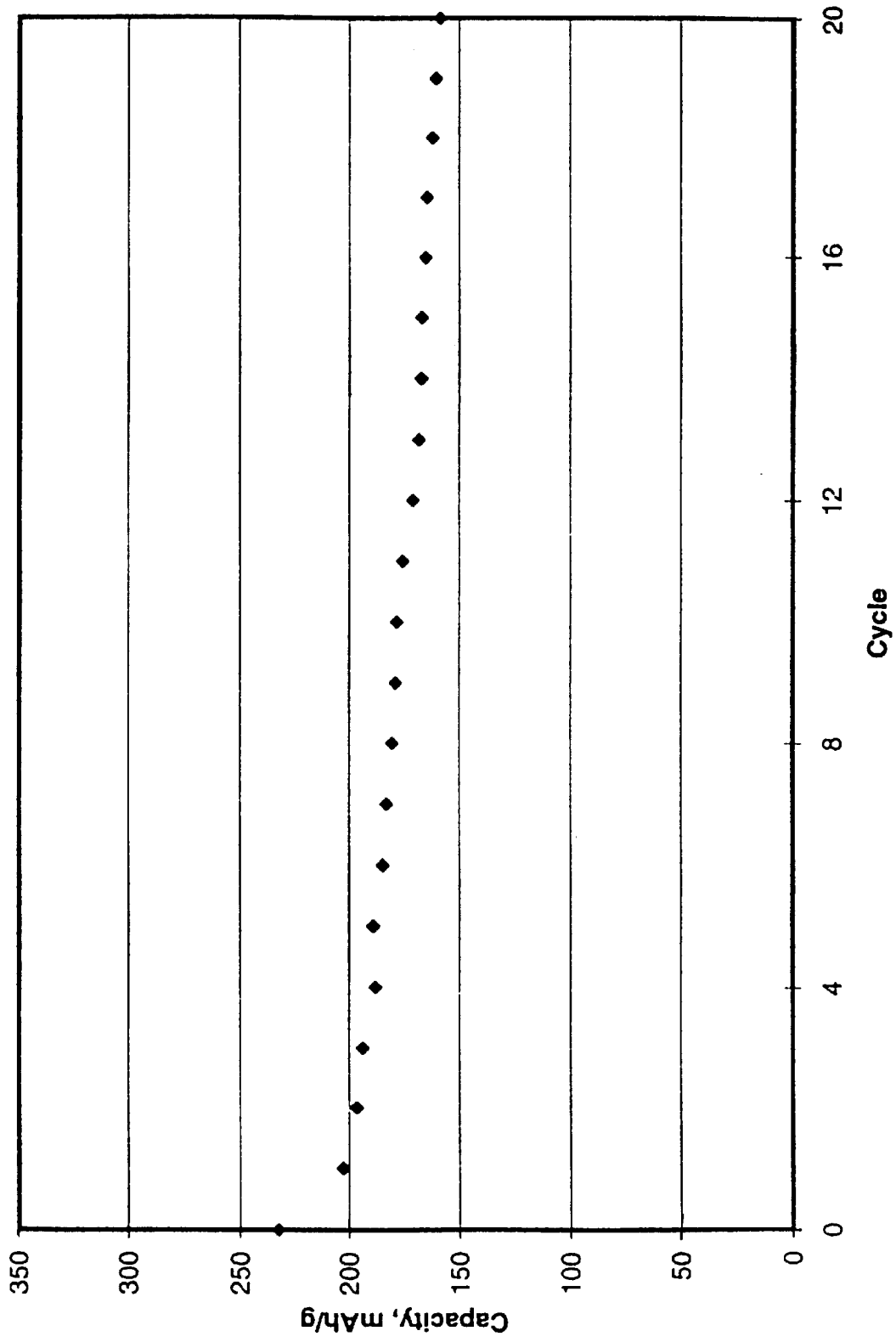
FIG. 3 is a plot of discharge capacity v. cycle number for a fluorine-doped electrode, specifically $Li_{1.2}V_3O_{7.9}F_{0.1}$.
Figure 4:
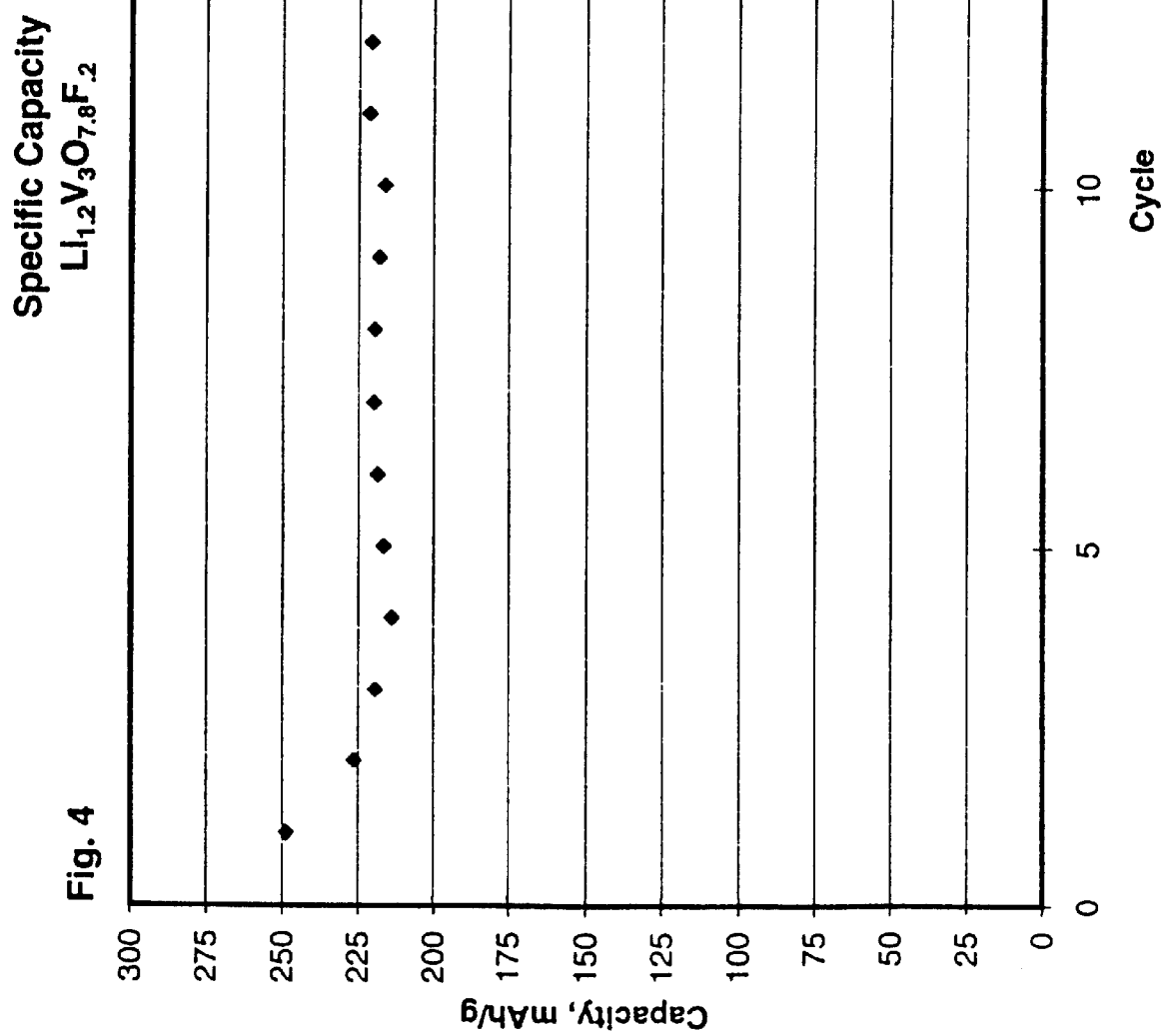
FIG. 4 is a plot of discharge capacity v. cycle number for a fluorine-doped electrode, specifically $Li_{1.2}V_3O_{7.8}F_{0.2}$.
Figure 5:
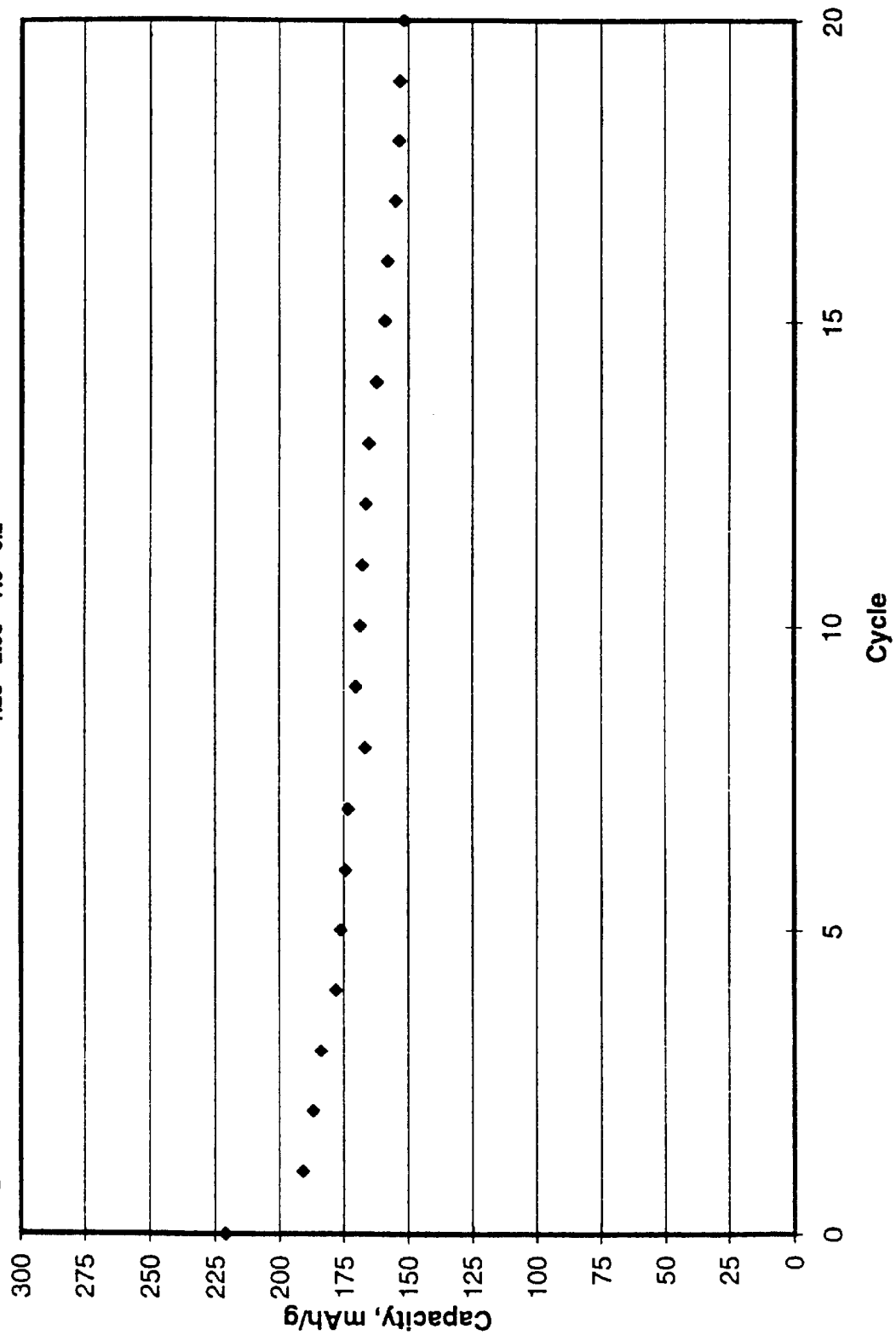
FIG. 5 is a plot of discharge capacity v. cycle number for a fluorine-doped electrode, specifically $Li_{1.25}V_{2.95}O_{7.8}F_{0.2}$.
Figure 6:
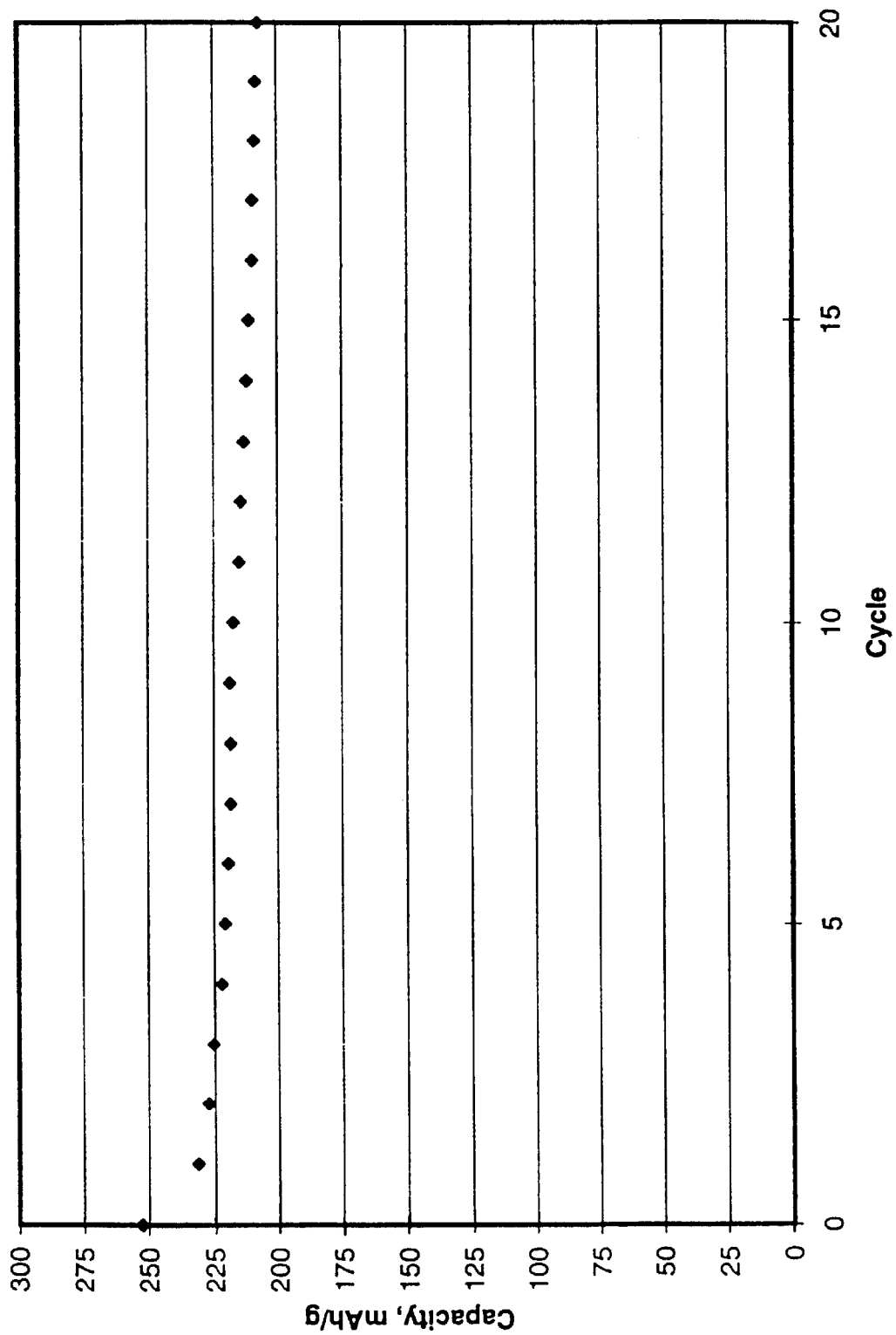
FIG. 6 is a plot of discharge capacity v. cycle number for a fluorine-doped electrode, specifically $Li_{1.2}V_{2.8925}Ti_{0.1075}O_{7.9}F_{0.1}$.
Figure 7:
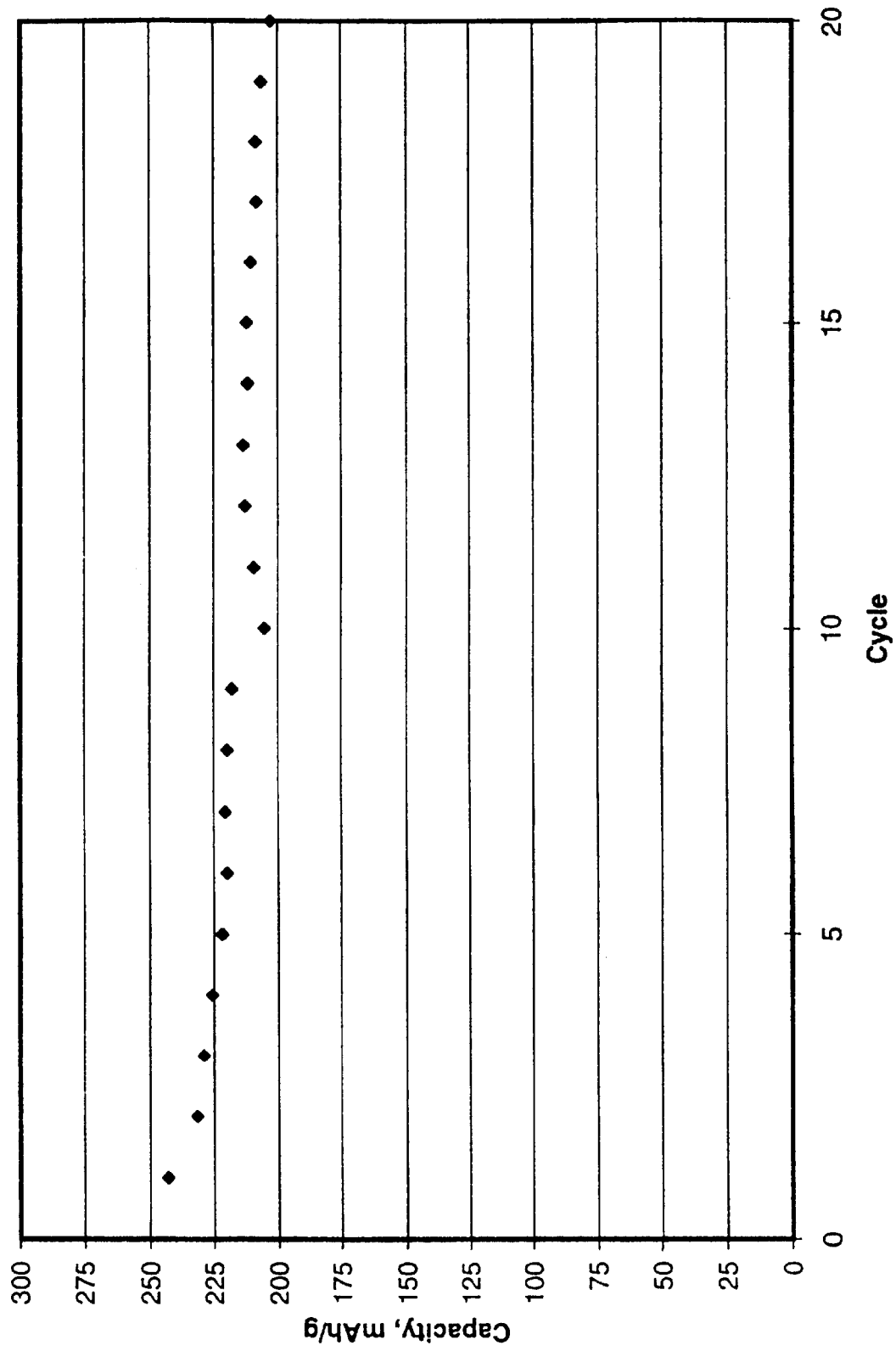
FIG. 7 is a plot of discharge capacity v. cycle number for a fluorine-doped electrode, specifically $Li_{1.2}V_{2.8925}Zr_{0.1075}O_{7.9}F_{0.1}$.
Figure 8:
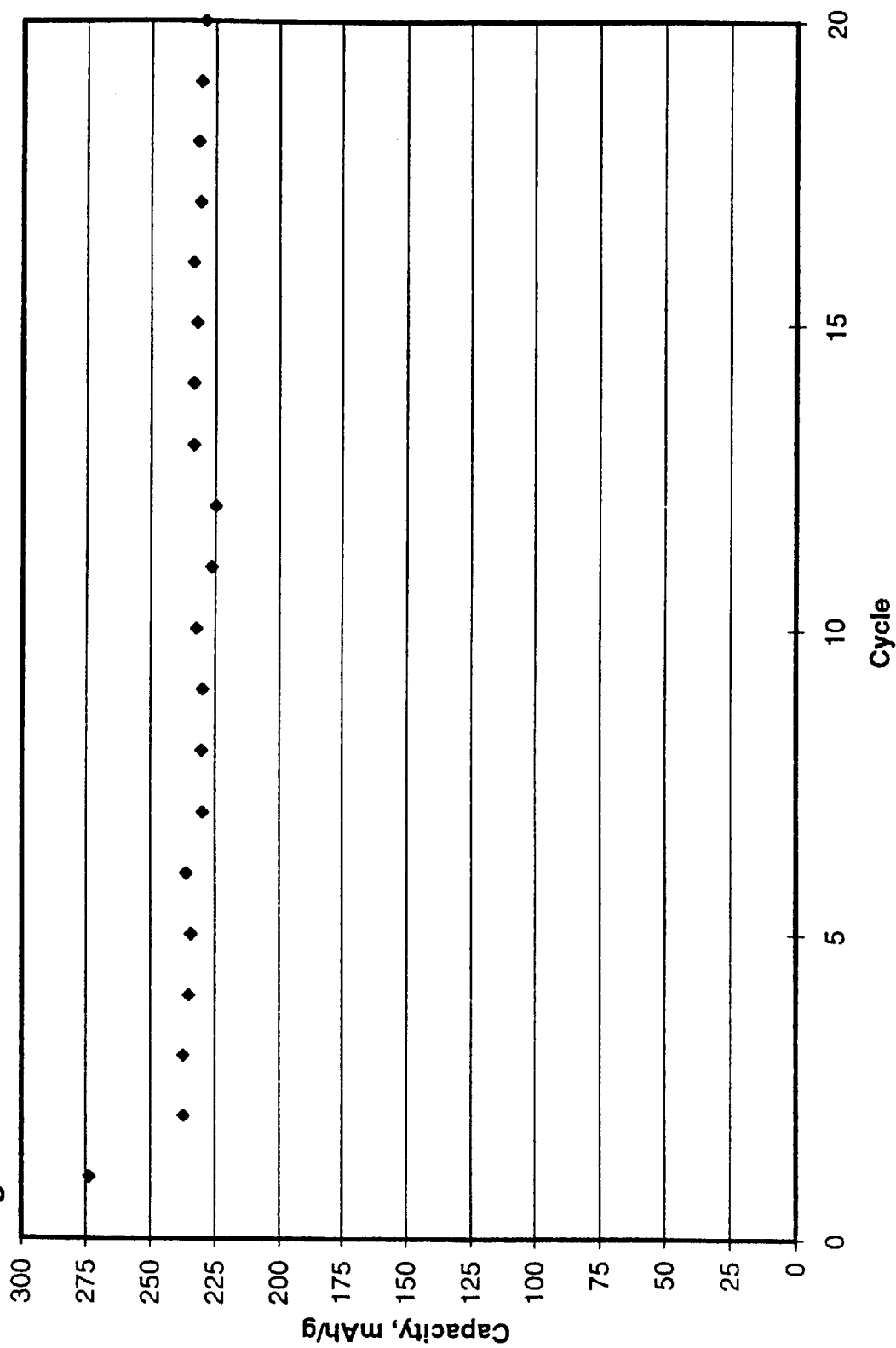
FIG. 8 is a plot of discharge capacity v. cycle number for a fluorine-doped electrode, specifically $Li_{1.2}V_{2.8}Ti_{0.1}Mo_{0.1}O_{7.9}F_{0.1}$.

A typical discharge/charge profile of a Li/1.0M $LiPF_6$, DMC, EC/$Li_{1.2}V_3O_8$ cell is shown in FIG. 1. This figure is also representative of the typical voltage profiles of a cell containing the fluorine-doped electrodes. The principles of the invention were demonstrated in the electrochemical data obtained from standard (undoped) $Li_{1.2}V_3O_8$ electrodes and from various fluorinated electrodes. Individual plots of discharge capacity vs. cycle number are provided in FIGS. 2 to 8 for: (1) standard (base) $Li_{1.2}V_3O_8$, (Example 1, FIG. 2); (2) $Li_{1.2}V_3O_{8-\delta}F_\delta$ with $\delta$=0.1 (Example 2, FIG. 3) and $\delta$=0.2 (Example 2, FIG. 4); (3) $Li_{1.2+\delta'}V_{3-\delta'}O_{8-\delta}F_\delta$ with $\delta'$=0.05 and $\delta$=0.2, i.e., $Li_{1.25}V_{2.95}O_{7.8}F_{0.2}$ (Example 3, FIG. 5); (4) $Li_{1.2}V_{2.8925}Ti_{0.1075}O_{7.9}F_{0.1}$ (Example 4, FIG. 6), $Li_{1.2}V_{2.8925}Zr_{0.1075}O_{7.9}F_{0.1}$ (Example 5, FIG. 7); and (5) $Li_{1.2}V_{2.8}Ti_{0.1}Mo_{0.1}O_{7.9}F_{0.1}$ (Example 6, FIG. 8). It was observed that, in general, the fluoride-doped electrodes led to higher capacities compared to the standard (base) $Li_{1.2}V_3O_8$ material. The best electrode materials observed to date in the experiments, with respect to capacity fade, included the $Li_{1.2}V_{2.8925}Ti_{0.1075}O_{7.9}F_{0.1}$ and $Li_{1.2}V_{2.8}Ti_{0.1}Mo_{0.1}O_{7.9}F_{0.1}$ samples. It is believed that further improvements in the performance of these fluorine-doped materials can be expected, once the composition and processing techniques and conditions are optimized.

Table 1 summarizes the typical electrochemical data that were obtained from fluorine-doped and M-doped $LiV_3O_8$ electrodes in accordance with this invention. The relative stability of the various electrodes is given as a function of capacity fade between cycle 2 and cycle 20, and compared with the performance of a standard electrode of nominal composition $Li_{1.2}V_3O_8$.

Table 1 demonstrates a general improvement in the electrochemical performance of the modified $Li_{1.2}V_3O_8$ electrodes in terms of both capacity and capacity fade after 20 cycles compared with the standard $Li_{1.2}V_3O_8$ electrode, and particularly those electrodes that doped with both fluorine and M cations. Table 1 demonstrates that a wide variety of dopant M cations can be used to improve the $Li_{1.2}V_3O_8$ electrode performance, particularly in terms of improving the capacity fade of the electrochemical cell.

TABLE 1

| Material | Capacity (mAh/g) Cycle 2 | Capacity (mAh/g) Cycle 20 | Capacity Fade (%) |
|---|---|---|---|
| $Li_{1.2}V_3O_8$ | 191 | 151 | 21 |
| $Li_{1.2}V_3O_{7.9}F_{0.1}$ | 203 | 161 | 21 |

TABLE 1-continued

| Material | Capacity (mAh/g) Cycle 2 | Capacity (mAh/g) Cycle 20 | Capacity Fade (%) |
|---|---|---|---|
| $Li_{1.2}V_3O_{7.8}F_{0.2}$ | 227 | 209 | 7 |
| $Li_{1.25}V_{2.95}O_{7.8}F_{0.2}$ | 191 | 153 | 20 |
| $Li_{1.2}V_{2.8925}Ti_{0.1075}O_{7.9}F_{0.1}$ | 232 | 208 | 10 |
| $Li_{1.2}V_{2.8925}Zr_{0.1075}O_{7.9}F_{0.1}$ | 232 | 203 | 12 |
| $Li_{1.2}V_{2.8}Ti_{0.1}Mo_{0.1}O_{7.9}F_{0.1}$ | 237 | 229 | 3 |
| $Li_{1.2}V_{2.85}Ti_{0.075}Mo_{0.075}O_{7.95}F_{0.05}$ | 245 | 210 | 14 |
| $Li_{1.2}V_{2.8}Zr_{0.1}Mo_{0.1}O_{7.9}F_{0.1}$ | 163 | 168 | −3 |
| $Li_{1.2}V_{2.85}Fe_{0.15}O_{7.9}F_{0.1}$ | 209 | 188 | 10 |
| $Li_{1.2}V_{2.93}Ni_{0.07}O_{7.8}F_{0.2}$ | 219 | 180 | 18 |
| $Li_{1.2}V_{2.8}Ti_{0.2}O_{0.9}F_{0.1}$ | 208 | 183 | 12 |

D. X-ray Diffraction Patterns

Figure 9:
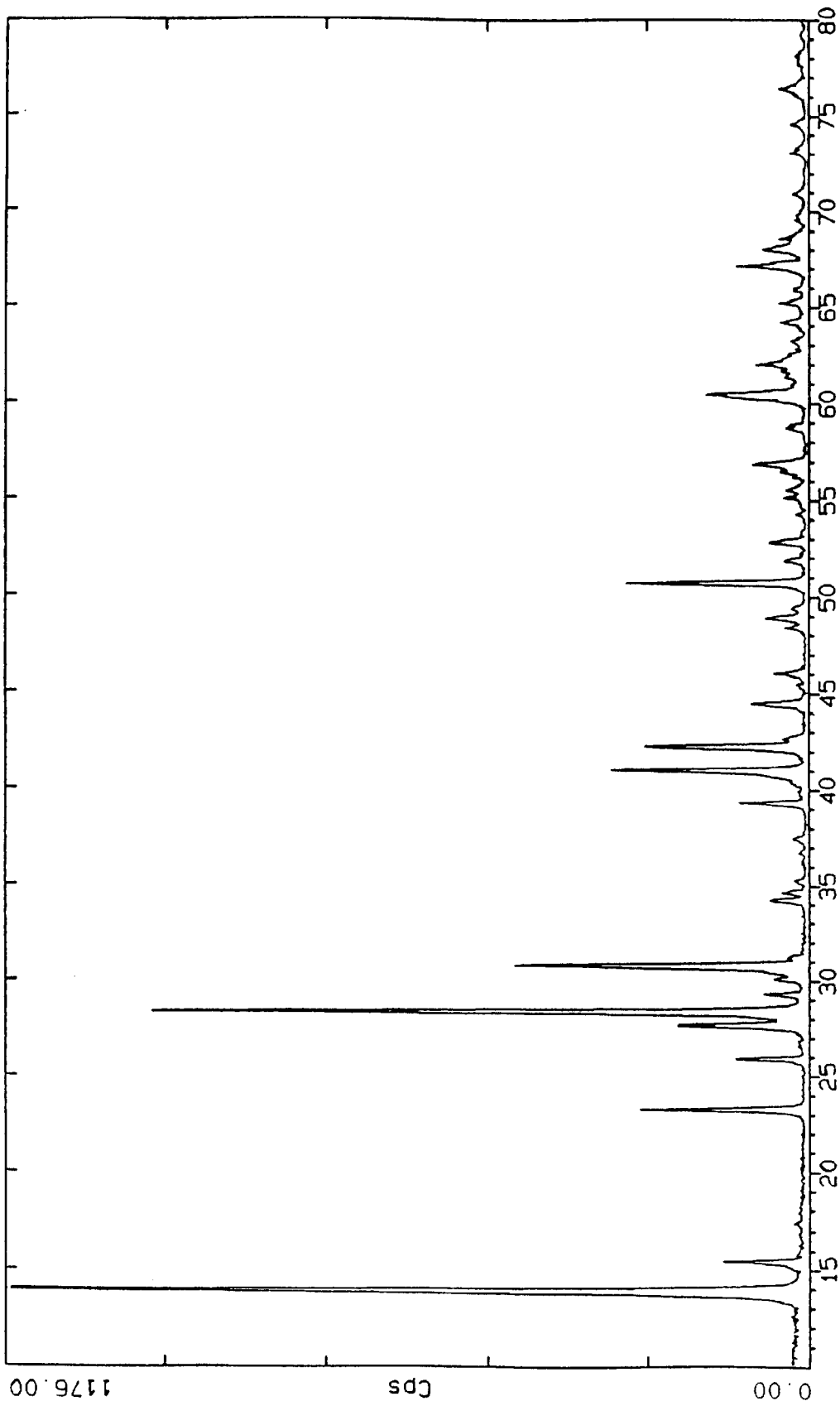
FIG. 9 is an X-ray pattern for $Li_{1.2}V_3O_8$.
Figure 10:
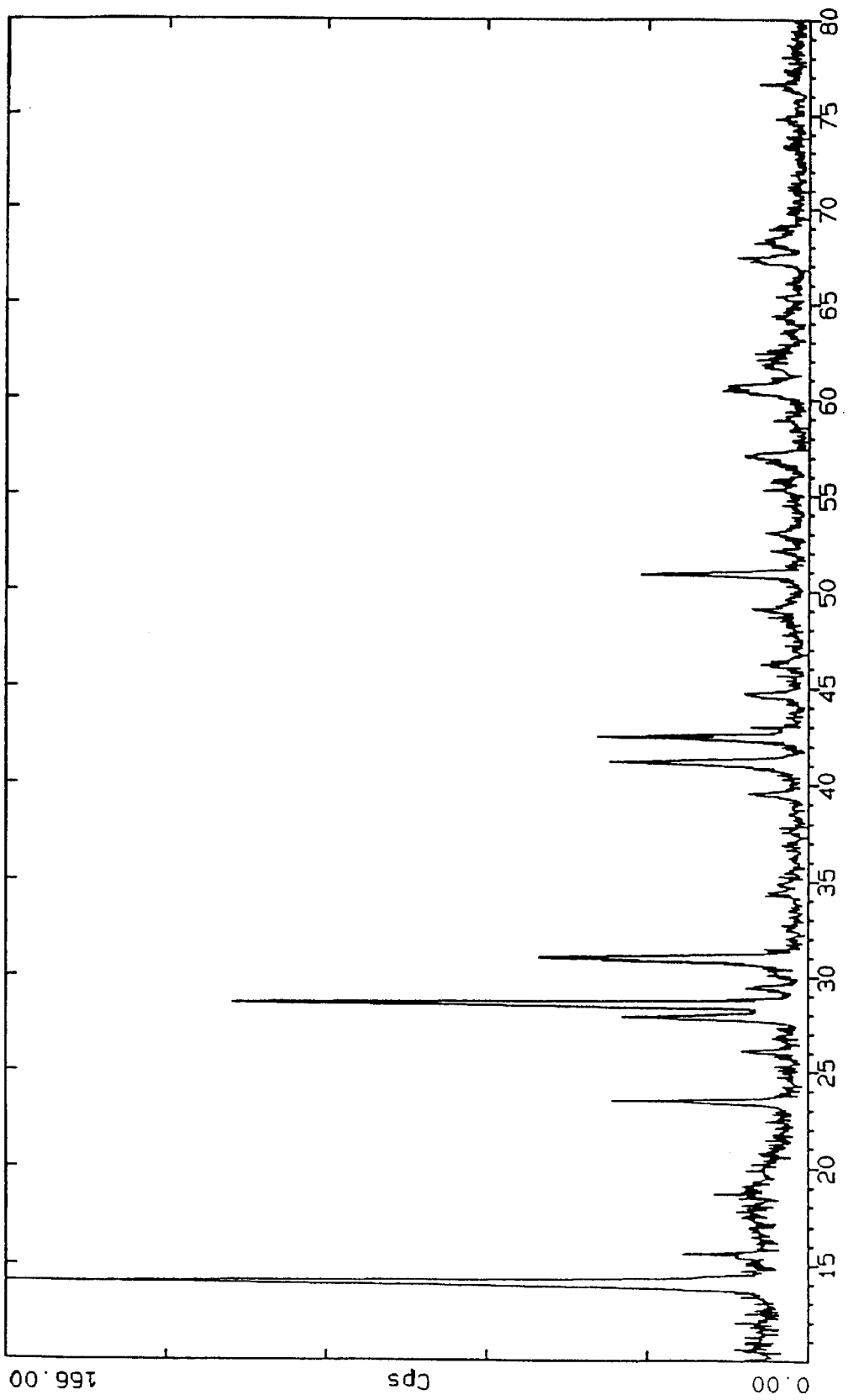
FIG. 10 is an X-ray diffraction pattern for $Li_{1.2}V_3O_{7.9}F_{0.1}$.
Figure 11:
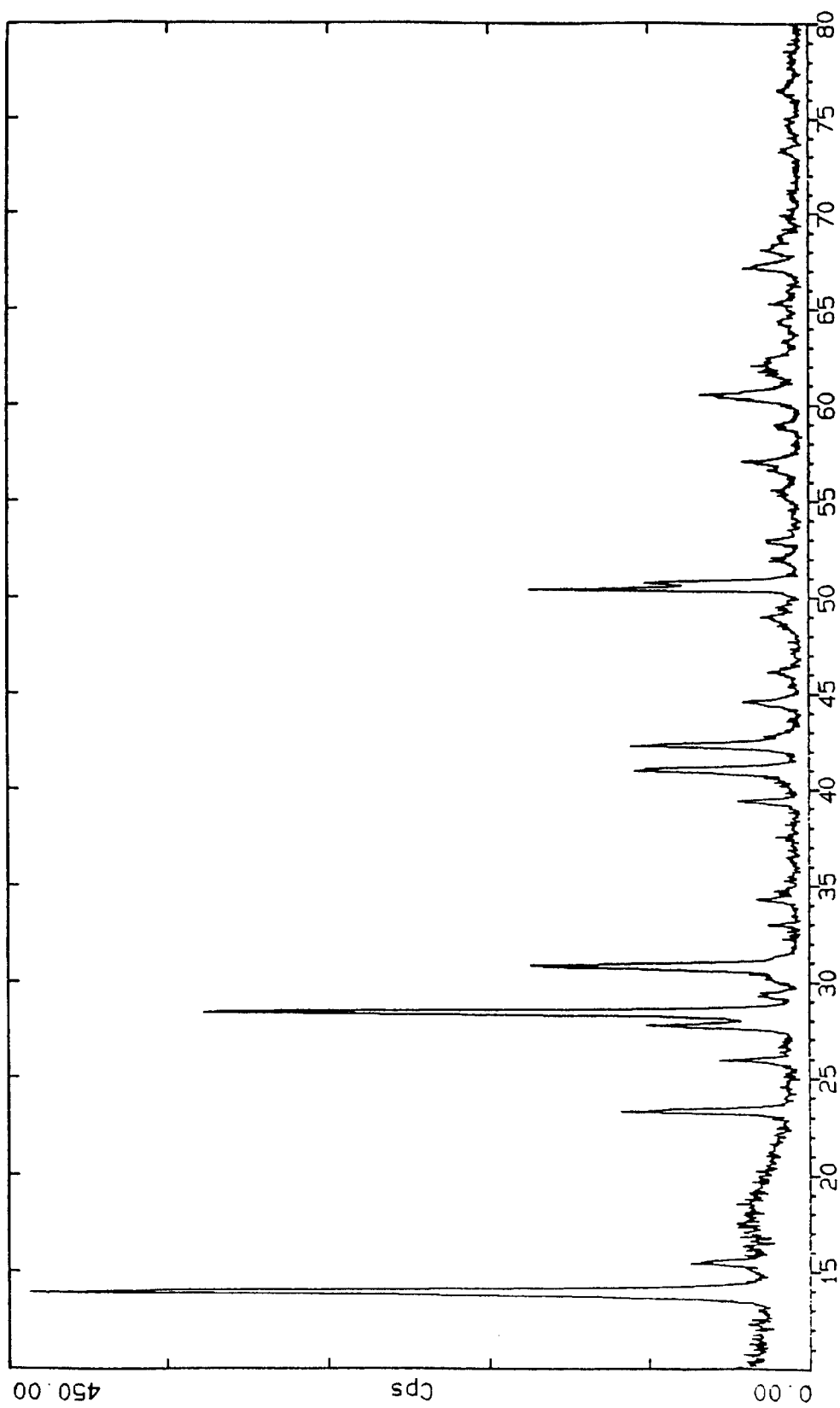
FIG. 11 is an X-ray diffraction pattern for $Li_{1.2}V_3O_{7.8}F_{0.2}$.
Figure 12:
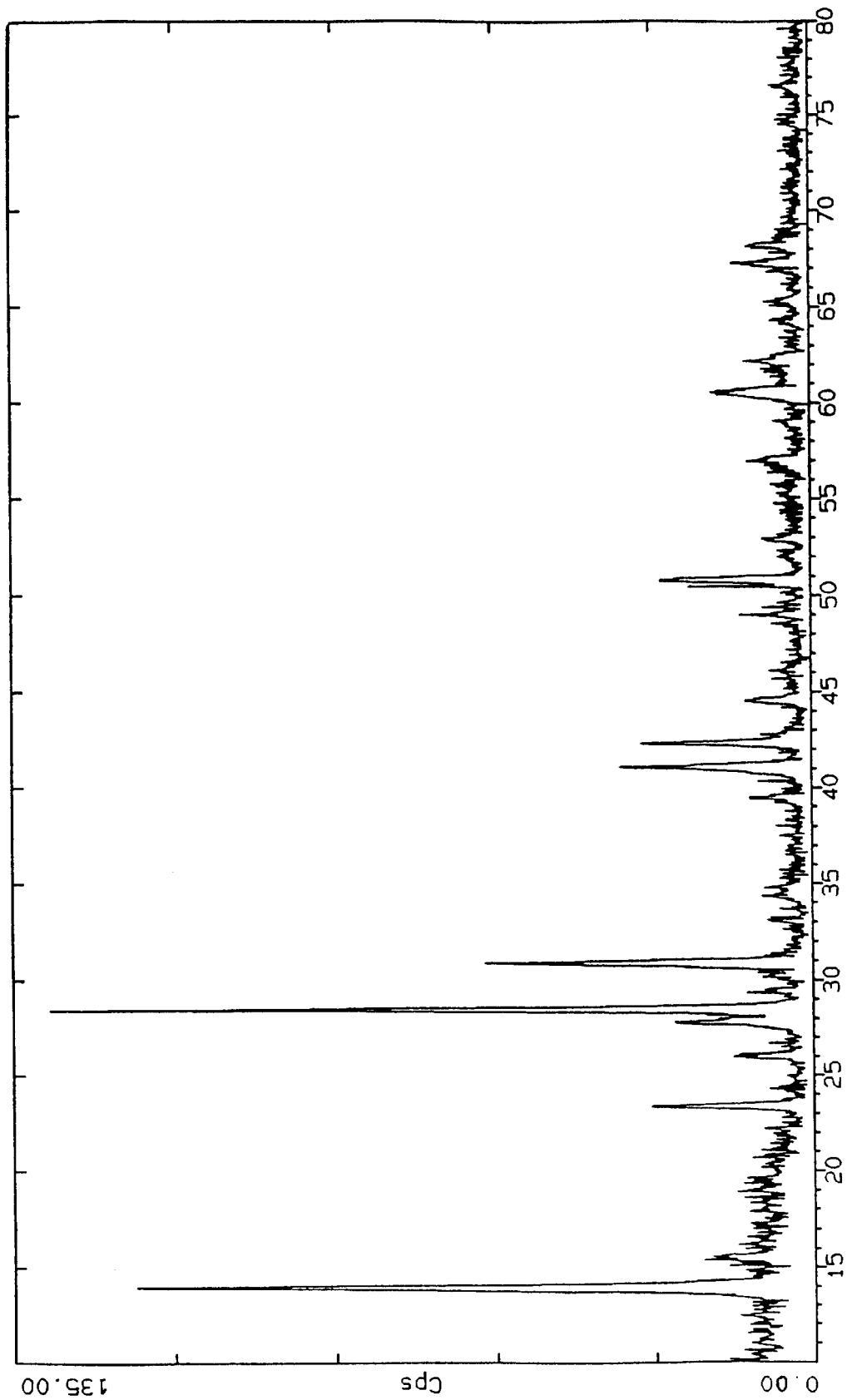
FIG. 12 is an X-ray diffraction pattern for $Li_{1.25}V_{2.95}O_{7.8}F_{0.2}$.
Figure 13:
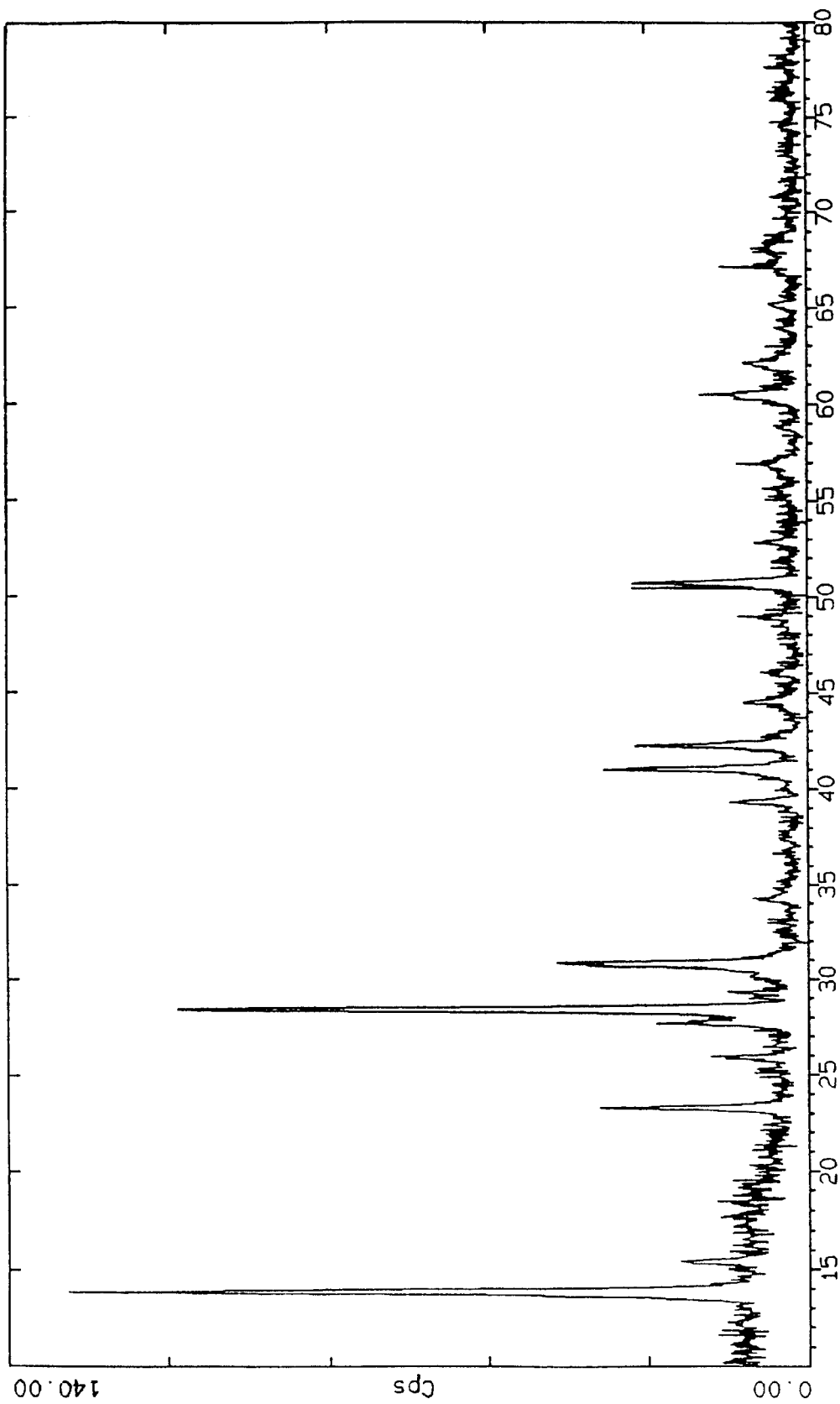
FIG. 13 is an X-ray diffraction pattern for $Li_{1.2}V_{2.8925}Ti_{0.1075}O_{7.9}F_{0.1}$.
Figure 14:
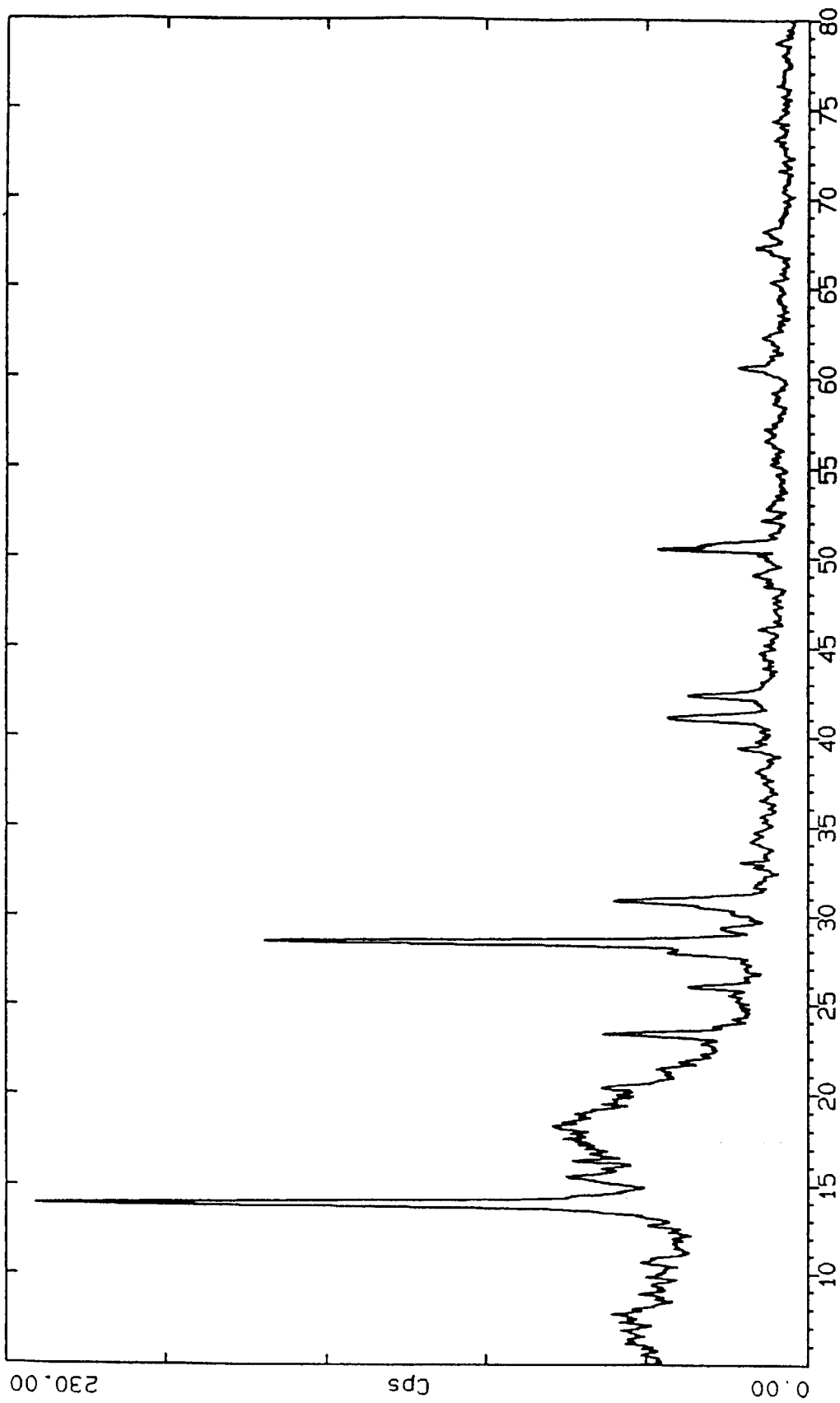
FIG. 14 is an X-ray diffraction pattern for $Li_{1.2}V_{2.8925}Zr_{0.1075}O_{7.9}F_{0.1}$.
Figure 15:
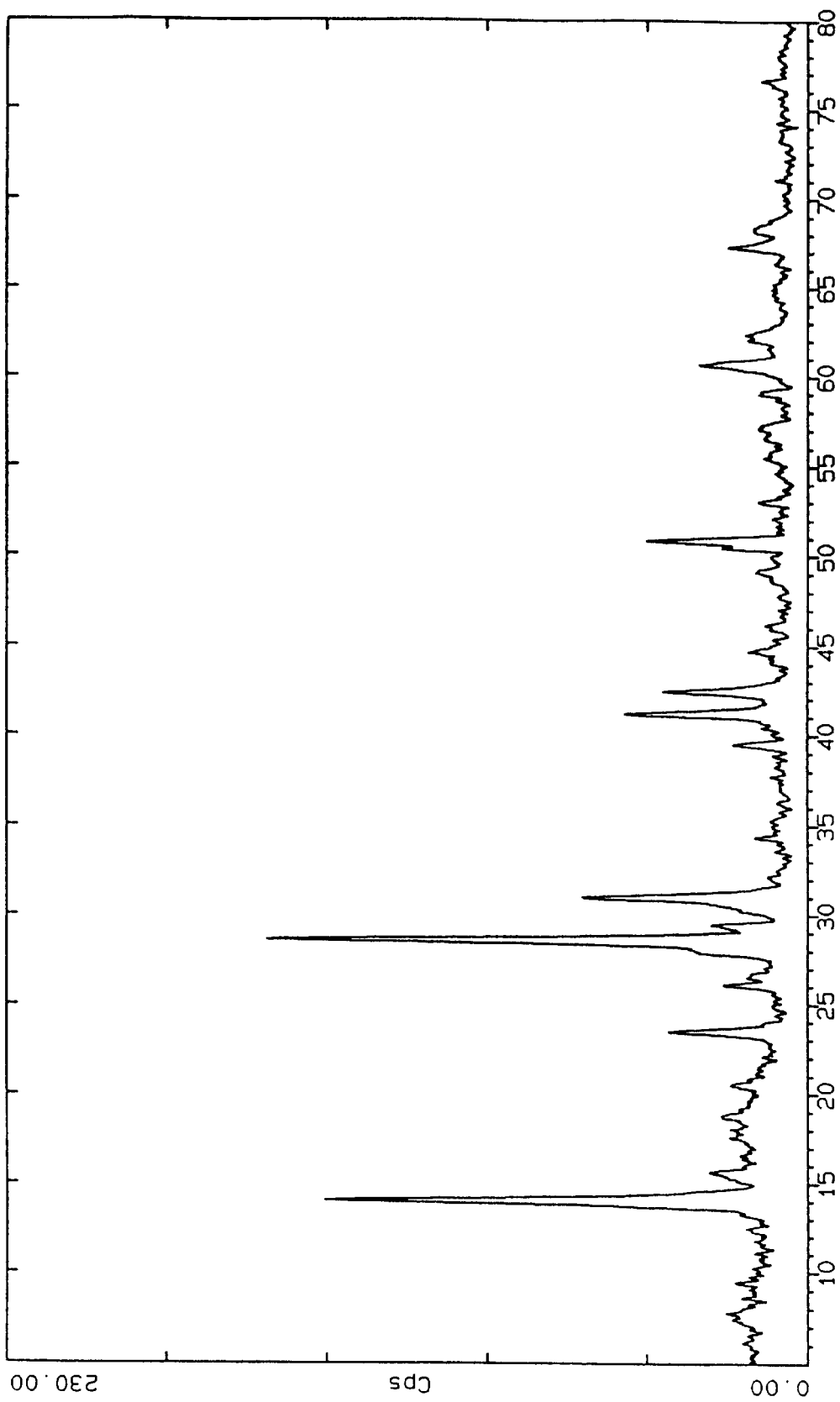
FIG. 15 is an X-ray diffraction pattern for $Li_{1.2}V_{2.8}Ti_{0.1}Mo_{0.1}O_{7.9}F_{0.1}$.

Powder X-ray patterns of the various samples (1) standard (base) $Li_{1.2}V_3O_8$ (FIG. 9); (2) $Li_{1.2}V_3O_{8-\delta}F_\delta$ with $\delta$=0.1 (FIG. 10) and $\delta$=0.2 (FIG. 11); (3) $Li_{1.2+\delta'}V_{3-\delta'}O_{8-\delta}F_\delta$ with $\delta'$=0.05 and $\delta$=0.2, i.e., $Li_{1.25}V_{2.95}O_{7.8}F_{0.2}$ (FIG. 12); (4) $Li_{1.2}V_{2.8925}Ti_{0.1075}O_{7.9}F_{0.1}$ (FIG. 13); (5) $Li_{1.2}V_{2.8925}Zr_{0.1075}O_{7.9}F_{0.1}$ (FIG. 14); and, (6) $Li_{1.2}V_{2.8}Ti_{0.1}Mo_{0.1}O_{7.9}F_{0.1}$ (FIG. 15) are provided in the Figures.

From the X-ray diffraction data it can be seen that most of the fluorinated samples are essentially single phase systems and can be indexed to the same structure as the parent $Li_{1.2}V_3O_8$ material.

E. Illustrations of Structures

Figure 16:
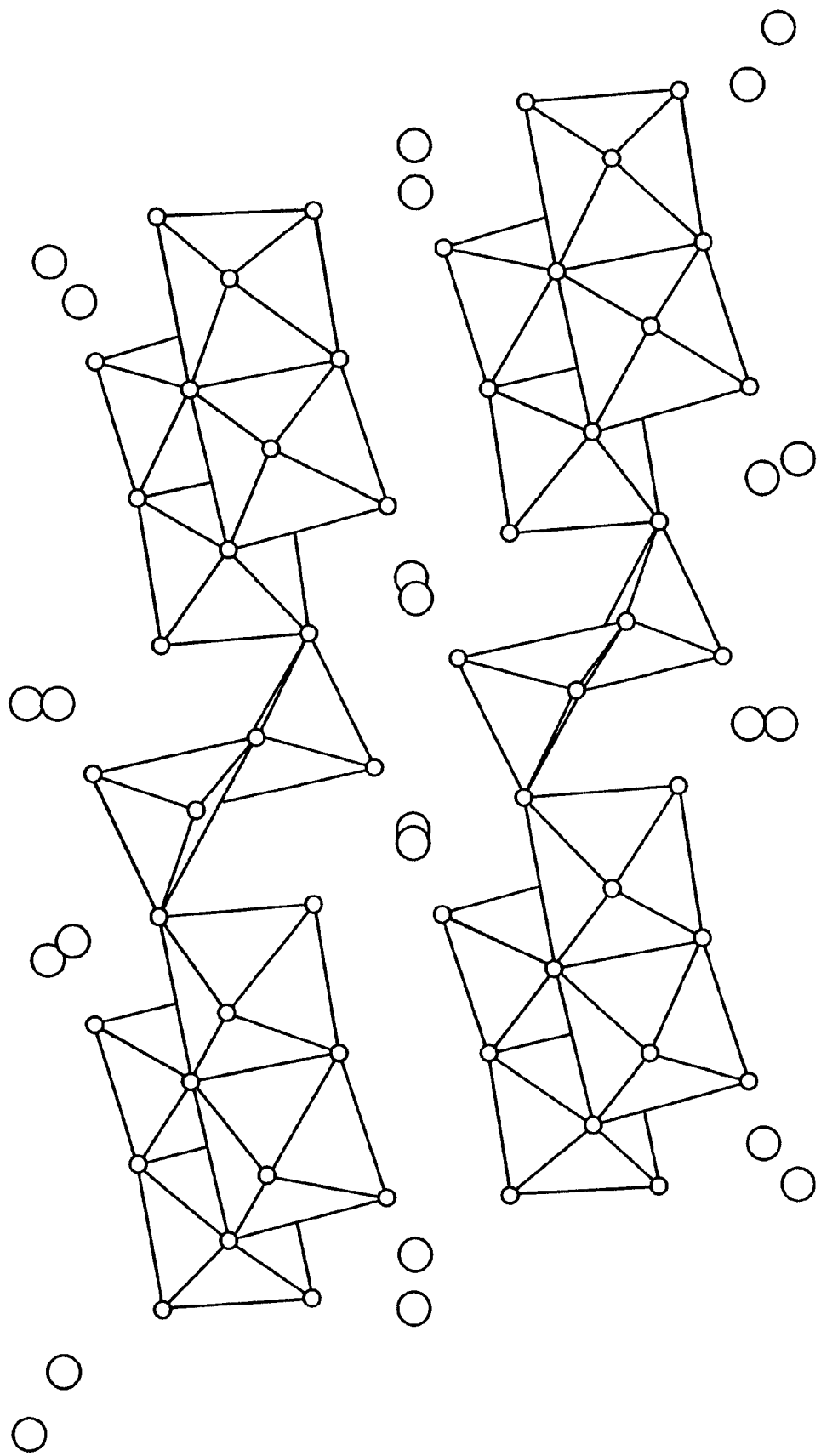
FIG. 16 is a representation of the structure of $Li_{1.2}V_3O_8$.
Figure 17:
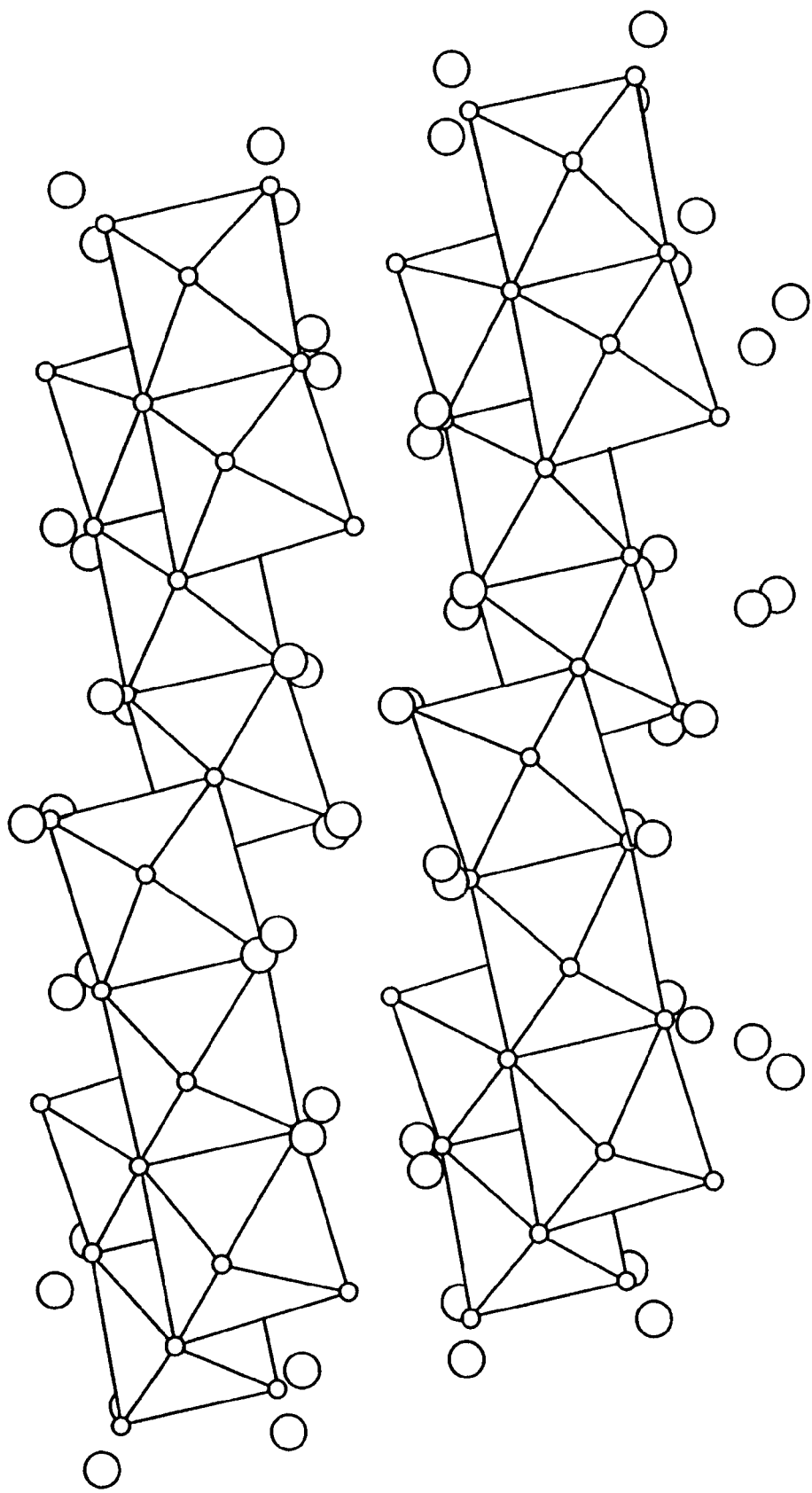
FIG. 17 is a structural representation of a discharged electrode product $Li_4V_3O_8$.

Structural representations of $Li_{1.2}V_3O_8$ and $Li_4V_3O_8$ are shown in FIGS. 16 and 17.

Referring first to FIG. 16, which represents the typical structure of $LiV_3O_8$, and applies to the lithium vanadium oxide "base" materials according to the present invention, the gray spheres represent lithium cations which are located in octahedra and tetrahedra. The vanadium layers are depicted as a combination of [$VO_6$] octahedra and [$VO_5$] square pyramids. The small open spheres on the polyhedra represent the oxygen ions. FIG. 16 is also representative of the fluorine-doped systems, in which the fluorine ions partially substitute for some of the oxygen ions.

FIG. 17 is a typical structural representation of a discharged electrode product $Li_4V_3O_8$. As before, the gray spheres represent lithium ions and the small open spheres the oxygen ions. In $Li_4V_3O_8$, the vanadium ions and lithium ions are all octahedrally coordinated The vanadium layers, therefore, consist of only [$VO_6$] octahedra. FIG. 17 is also generally representative of the discharged fluorine-doped electrodes according to the present invention.

What is claimed is:

1. A vanadium oxide material according to the average formula:

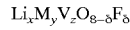

$Li_xM_yV_zO_{8-\delta}F_\delta$ wherein:

(a) $0<\delta\leq1$;

(b) $0\leq y\leq 0.5$;

(c) x is non-zero;

(d) x, y and z are selected such that the average, calculated, oxidation state of V is at least 4.6; and (e) M is selected from the group consisting of Al, Si, P, Sc, Ti, Cr, Mn, Fe, Co, Ni, Cu, Zn, Ge, Y, Zr, Nb, Mo, La and mixtures thereof.

2. A vanadium oxide material according to claim 1, wherein:

(a) y=0;

(b) z=3; and (c) $1 \leq x \leq 1.5$.

3. A vanadium oxide material according to claim 1, wherein:

(a) y=0;

(b) z=3−δ'; and (c) X=1.2+δ' wherein δ'=0.254δ.

4. A vanadium oxide material according to claim 1, wherein:

(a) the average oxidation state of V is at least 4.8.

5. A vanadium oxide material according to claim 1, wherein:

(a) y is non-zero; and (b) M is selected from the group consisting of Ti, Y, Zr, Mo and mixtures thereof.

6. A vanadium oxide material according to claim 1, wherein:

(a) x=1.2;

(b) z=3−δ'

(a) y=δ', wherein δ'=1.075δ; and (d) M is selected from the group consisting of Ti, Zr, and mixtures thereof.

7. A vanadium oxide material according to claim 1, wherein:

(a) $1 \leq x \leq 1.5$;

(b) z=2.8;

(c) δ=0.1;

(d) y is non-zero; and (e) M is selected from the group consisting of Ti, Y, Zr, Mo and mixtures thereof.

8. An electrode comprising:

(a) a vanadium oxide base according to the average formula:

wherein:

(i) $0<\delta \leq 1$;

(ii) $0 \leq y \leq 0.5$;

(iii) x is non-zero;

(iv) x, y and z are selected such that the average oxidation state of V is at least 4.6; and (v) M is selected from the group consisting of Al, Si, P, Sc, Ti, Cr, Mn, Fe, Co, Ni, Cu, Zn, Ge, Y, Zr, Nb, Mo, La and mixtures thereof.

9. An electrode according to claim 8, wherein:

(a) y=0;

(b) z=3; and (c) $1 \leq x \leq 1.5$.

10. An electrode according to claim 8, wherein:

(a) y=0;

(b) z=3−δ'; and (c) x=1.2+δ';

wherein δ'=0.254δ.

11. An electrode according to claim 8, wherein:

(a) the average oxidation state of V is at least 4.8.

12. An electrode according to claim 8, wherein:

(a) y is non-zero; and (b) M is selected from the group consisting of Ti, Y, Zr, Mo and mixtures thereof.

13. An electrode according to claim 8, wherein:

(a) X=1.2;

(b) z=3−δ';

(c) y−δ', wherein δ'=1.075δ; and, (d) M is selected from the group consisting of Ti, Zr and mixtures thereof.

14. An electrode according to claim 8, wherein:

(a) x=1.2;

(b) z=3−δ';

(c) y=δ', wherein δ'=1.075δ, and (d) M is selected from the group consisting of Ti, Zr and mixtures thereof.

15. An electrode according to claim 8 further comprising:

(a) binder; and (b) conductive material.

16. An electrochemical cell comprising:

(a) a cathode comprising a vanadium oxide base according to the average formula:

wherein:

(i) $0<\delta \leq 1$;

(ii) $0 \leq y \leq 0.5$;

(iii) x is non-zero;

(iv) x, y, and z are selected such that the average oxidation state of V is at least 4.6; and (v) M is selected from the group consisting of Al, Si, P, Sc, Ti, Cr, Mn, Fe, Co, Ni, Cu, Zn, Ge, Y, Zr, Nb, Mo, La and mixtures thereof.

17. A method of modifying a nominal vanadium oxide formulation of $Li_xV_3O_8$, wherein $1 \leq x \leq 1.5$, for use as an electrode material; said method comprising a step of:

(a) providing fluorine-doping of the formulation to form a fluorine-doped base formulation, having an average vanadium oxidation state of at least 4.6.

18. A method according to claim 17 further including a step of:

(a) also doping with cation M selected from the group consisting of Al, Si, P, Sc, Ti, Cr, Mn, Fe, Co, Ni, Cu, Zn, Ge, Y, Zr, Nb, Mo, La and mixtures thereof.

* * * * *

UNITED STATES PATENT AND TRADEMARK OFFICE
CERTIFICATE OF CORRECTION

PATENT NO.    : 6,004,697
DATED         : December 21, 1999
INVENTOR(S)   : Michael M. Thackeray, Arthur J. Kahaian, Donald P. Visser, Dennis W. Dees, and Roy Benedek.

It is certified that error appears in the above-identified patent and that said Letters Patent is hereby corrected as shown below:

Title page,
Item [56], References Cited,
U.S. PATENT DOCUMENTS,
Between "5,618,640 4/1997 Idota et al." and "5,759,720 6/1998 Amahicci et al.", please insert therefor -- 5,674,645 10/1997 Amatucci et al. --.

FOREIGN PATENT DOCUMENTS,
Before "7-33433 2/1995 Japan" please insert therefor -- 0 394 917 A1 10/1990 European Patent Office --.

Before "7-33433 2/1995 Japan" and after "0 394 917 A1 10/1990 European Patent Office" please insert therefor -- 0 397 068 A2 11/1990 European Patent Office --.

Signed and Sealed this

Eleventh Day of December, 2001

*Attest:*

NICHOLAS P. GODICI
*Attesting Officer*    *Acting Director of the United States Patent and Trademark Office*